(12) United States Patent
Olson et al.

(10) Patent No.: US 9,833,714 B2
(45) Date of Patent: Dec. 5, 2017

(54) SOFTWARE PLATFORM AND METHOD FOR GAMIFICATION OF PRODUCT/CONTENT MARKETS

(71) Applicant: SQD Holdings LLC, McLean, VA (US)

(72) Inventors: Colin Charles Olson, Alexandria, VA (US); William Brett Sechrest, Arlington, VA (US); Erich Kipling Oliphant, Washington, DC (US)

(73) Assignee: SQD Holdings, Inc., Arlington, VA (US)

( * ) Notice: Subject to any disclaimer, the term of this patent is extended or adjusted under 35 U.S.C. 154(b) by 194 days.

(21) Appl. No.: 14/668,785

(22) Filed: Mar. 25, 2015

(65) Prior Publication Data

US 2015/0273342 A1    Oct. 1, 2015

Related U.S. Application Data

(60) Provisional application No. 61/970,240, filed on Mar. 25, 2014.

(51) Int. Cl.
*A63F 9/24* (2006.01)
*A63F 13/00* (2014.01)
*G06F 17/00* (2006.01)
*G06F 19/00* (2011.01)
*A63F 13/822* (2014.01)
*G06Q 30/02* (2012.01)

(52) U.S. Cl.
CPC ....... *A63F 13/822* (2014.09); *G06Q 30/0202* (2013.01)

(58) Field of Classification Search
CPC .................................................. A63F 13/822
See application file for complete search history.

(56) References Cited

U.S. PATENT DOCUMENTS

2008/0125227 A1 *    5/2008    Bui .................... A63F 13/00
                                                                463/42

* cited by examiner

*Primary Examiner* — Kevin Y Kim

(57) ABSTRACT

An online software Platform and method whereby a plurality of users compete to make predictions about the purchasing behavior of a plurality of consumers in a (typically digital) marketplace. The disclosed gamification method allows most product markets to be gamified via the software and algorithms comprising the disclosed standalone Platform.

10 Claims, 19 Drawing Sheets

SOFTWARE PLATFORM AND METHOD FOR GAMIFICATION OF PRODUCT/CONTENT MARKETS

RELATED APPLICATIONS

This application claims the benefit of U.S. Provisional Application No. 61/970,240, filed Mar. 25, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Gamification has been defined as the use of game thinking and game mechanics to engage users in non-game contexts. It is frequently employed to improve customer retention and encourage desired user interactions with web-based enterprises by incenting users to achieve specific tasks or actions with publicly-visible or financially-beneficial forms of recognition such as points, badges, or digital currencies. Human predilections for achievement, status, and competition help drive the desired behaviors. Some examples of gamified behavior include: badge systems and leaderboards tied to user product views, point systems tied to a user's promotion of products on social networks, and level systems for employees who achieve task milestones in the workplace.

An industry dedicated to implementing gamification techniques for enterprise customers has begun to develop in recent years and a number of firms advertise an ability to generically gamify nearly every aspect of a user's experience with any given web site. These "gamification engines" allow an enterprise customer to, among other things, build leaderboards, specify what user website interactions deserve incentives, specify what and how much they receive for incentivized actions, and dictate the timeframe over which incentives are valid. These customizations are usually exposed via an application programming interface (API) that allows web developers to link the gamification engine with the underlying code of the host site.

A problem with existing gamification engines is that the possible "game" components incorporated into the host site can hardly be classified as anything resembling a game; rather, they might better be described as competitive loyalty points. Users are not engaged in a manner that encourages creative thinking nor are they encouraged to engage with a system that rewards tasks of ever increasing difficulty; instead, the user is induced to complete mindless tasks such as viewing an item, "liking" an item on Facebook, forwarding a link of the item to their friends, visiting specific regions of a site, or any number of similarly tedious actions that are useful to owners of the host site but otherwise reduce the user to completing tasks in a manner akin to a rat pressing a lever for treats. Introducing a public accounting of the points acquired performing such actions may activate competitive instincts that briefly encourage desired consumer behaviors but, ultimately, the lack of any need for skill will result in users losing interest.

BRIEF SUMMARY OF THE INVENTION

The present invention, in one embodiment, provides a method of gamification that increases traffic to and improves the visibility of product/content markets by enabling a plurality of individuals to earn recognition and prizes for successfully predicting the purchasing behavior of a plurality of consumers in said markets.

In contrast to prior systems, the present invention provides a software platform and method (The Platform) whereby users may engage with a host site in a manner more akin to a game in the true sense of the word. The disclosed method and software platform is applicable to commercial host sites that seek to sell a plurality of products to a plurality of consumers through an online marketplace. In particular, the disclosed invention generically allows users of a commercial host site to gain status or win prizes by correctly anticipating the purchasing habits of other users of the marketplace. The disclosed software platform tracks the purchasing behavior of market participants on the host site and enables users (not necessarily market participants) to anticipate market behavior by allocating a fixed number of digital markers (e.g., "chips", "chits", "tokens", etc.) provided by The Platform. These digital markers are used to award users each time the "marked" products are purchased. In the most general case, Players are allowed to remove and reallocate their markers as desired.

In yet another embodiments, the present invention provides a platform that is capable of monitoring the flow of purchases through the marketplace (acting in one extreme as the market maker and simply as a market observer in the other extreme) and correctly rewards those playing the game (Players) according to their indicated expectations. Players accumulate some measure of accomplishment such as points or digital currency proportional to purchases made through the marketplace. In a currency-based embodiment the currency can be redeemed for goods, services, or events as determined by the host site. In a point-based embodiment users with the most accumulated points over a given time period are rewarded with status, cash, or prizes as dictated by the host site. The former is more expensive than the latter because all users are effectively winners and care must be taken when setting the exchange rate of the digital currency.

The Platform may also be used to gamify products that can be described by the following hierarchy: product archetype→product subtype→product line→product instance. For example, books are a product archetype, crime novels are a product subtype (genre), a specific title (e.g., Arthur Conan Doyle's "The Hound of the Baskervilles") is a product line, and a physical or digital copy of said book is a product instance. The game works best when it is possible to sell many (infinite in the case of digital copies) product instances of a product line through the enterprise site. The game can be vertically integrated such that players compete to pick the best product lines from within a given product subtype (e.g., competing only within the Rap music genre) or horizontally integrated across various product subtypes within a product archetype (e.g., competing to pick best overall music album sales regardless of genre). In fact, gamification across products is also possible; to pick one example, the disclosed gamification concept and software platform could be applied to all of the products sold through a large online retailer.

The Platform enables Players to assign digital markers to products, manage their digital markers over time (adjust their marker portfolio), and keep track of points scored for them by said products. The Platform enables this functionality for any website selling products that fit the above hierarchal description. The Platform can be fully integrated, partially integrated, or passively integrated with existing vendor sites depending on the degree to which The Platform handles payments and product delivery.

When both payments and product delivery are effected through The Platform it is enclosed and fully integrated with the commercial host (Vendor) site (FIG. 1). The Platform is semi-enclosed and partially integrated when product delivery is performed by a third party (e.g., the Vendor). When neither payment nor delivery is handled by The Platform, it is passively integrated with the Vendor site. In this case, The Platform passively receives information about product sales such that points can be appropriately apportioned among Players (FIG. 2). A new e-book seller might desire the fully integrated embodiment, a brewery seeking to gamify their online sales might desire the partially integrated embodiment, and an established site such as a large online retailer could passively integrate The Platform.

In other aspects, the product marketplace need not be contained within The Platform, but the ability for consumers to allocate digital markers to product lines is so contained. The Vendor decides which product lines they would like to gamify and The Platform manages the details of Player portfolios, subsequent payout apportioning from product sales, and redemption of payouts.

The disclosed method for gamification of product markets is beneficial to both consumers and Vendors for three primary reasons. (1) The consumer benefits because they are entertained and provided an opportunity to win prizes at no cost other than time spent managing their portfolio of product markers. (2) Vendors benefit because the game draws public attention to the market venue and because players who have placed markers on products are implicitly incentivized to advertise those products to their social networks via social media, email, and/or offline personal relationships, or even make their own purchases. (3) The Vendor receives valuable data in the form of market analytics from Players' placement of product markers.

Some aspects of the disclosed gamification method are generic and changeable: (1) number of digital markers allocated to each Player, (2) the payout trigger, and (3) the victory condition. These aspects are specific to game mechanics and the choice of values can emphasize certain consumer behaviors, increase complexity, provide additional marketing information, and improve competition between players. For example, allocating more markers to each Player increases Player choice and differentiation at the expense of increased complexity. Additional markers also provide the Vendor with more information about what products users believe will sell well. Linking the payout trigger to number of purchases rather than cost of purchases provides better information about what products the crowd believes will be generically popular but removes information about what the crowd believes will be most financially successful due to the combination of pricing and demand. A victory condition governed by accumulating the most points over a fixed time period differs significantly from an e-currency paradigm where points gained from playing the game are directly redeemable for prizes or cash at some conversion rate. The former is likely to be preferred in most embodiments for three reasons: (1) reduction in costs for the supporting website (only a subset of top scorers receives compensation as opposed to every user of the system); (2) increased interaction from players (static accounts will not accumulate the most points due to the public's evolving taste); (3) fairness to Players who make poor initial choices or who join the game after it has already been established (each new time period affords a fresh start to all Players). These characteristics combine to make the game appealing to all Players and drive interaction with the game and its host site.

A non-exhaustive list of some possible embodiments of the disclosed method is here presented to provide a sense of possibilities. In one embodiment an e-book vendor chooses to partially integrate The Platform into their site. All book sales are processed through The Platform's internal market making software and each sale (1) alerts the host site that an e-book should be provided to the purchaser (partially integrated) and (2) triggers an e-currency payout to each Player who has placed digital markers on the book. The Vendor has decreed that the accumulated e-currency may be traded in at a set rate for discounts on books purchased through the site.

An additional embodiment may use passive integration of The Platform into a large online retailer or the online sales component of a big box retailer. The Vendor selects the range of products to be gamified and also decides to have tiered fixed-time contests broken into daily, weekly, and monthly time periods. Players score points based on their product markers and the Vendor decides on the following payout scheme: the top 20 daily winners are given discounts on purchases from the Vendor; the top 10 weekly winners are given their choice of larger discounts or a free product of the Vendor's choosing; and the top three monthly winners are given a cash prize. At the end of each month each Player's point total is reset and the next month's game begins (i.e., points used to score daily and weekly contests are the same points used for the monthly contest).

In another embodiment a local brewer wishes to gamify sales from their brewery by passively integrating The Platform into their point of sale system. Beer sales through their physical store are tracked by The Platform and the relevant payouts made to participating Players who have placed markers on various beer varieties. In this case the brewer has decided to deal with a point-driven fixed-time contest. Each month the top 10 players are rewarded with merchandise and beer discounts.

In another embodiment a restaurant chain seeks to gamify their sales by passively integrating The Platform into their point of sale systems. All menu items are selected for gamification and the point payouts are selected to be proportional to the price of each menu item. Each Player is allocated 100 markers and the restaurateur specifies that no single menu item may have more than two markers. The restaurateur also specifies that the proportionality constant between menu price and points paid be confidential and randomly selected for each weekly period in order to prevent competitors or stock market investors from gaining advanced sales data. Alternatively, the restaurateur could specify that only rankings be displayed to Players along with a measure of relative proximity to the top Player (e.g., Player X has 95% of the points obtained by the top Player). In this case, the relative contribution of products to a Player's point total could be provided but not the raw point totals (thus maintaining a Player's ability to adjust their portfolio in response to performance). A weekly contest period is chosen and the top 50 winners for each week are given vouchers for free meals and discounts.

In yet another embodiment an online music distribution site fully integrates The Platform to sell music downloads.

Music artists upload their content (music albums) to The Platform where they can be previewed by the public and then downloaded for a fee. Players allocate their allotted markers (say 100 markers) as they choose among the various albums that are for sale in the marketplace. The Vendor decides that each download of a full album will pay 10 points for each marker that a Player has placed (i.e., multiple markers may be placed on a single album) while downloads of singles from said album will pay 1 point to the relevant Players. Fixed-time weekly, monthly, and yearly contests are selected with the following payouts: the top 20 weekly winners get discounted downloads for three months; the top five monthly winners get cash prizes; the top three yearly winners get backstage passes and airfare to a concert of their choosing by any band selling music through the marketplace.

The above embodiments are not an exhaustive list but help delineate the variety of markets that can be gamified by the disclosed method and software platform. Other product possibilities include, but are not limited to: clothing, automobiles, sporting goods, films, 3D printing plans, graphic art, magazines, video games, smart phone applications, groceries, industrial equipment, commodities, event tickets, home furnishings, and so forth. In essence, any online or physical market or point-of-sale system that can fully, partially, or passively integrate the disclosed software platform may be gamified by the disclosed method.

In further embodiments, the present invention provides an online software Platform and method whereby a plurality of users compete to make the best predictions about the purchasing behavior of a plurality of consumers in a (typically digital) marketplace. Capabilities of software and algorithms comprising The Platform may include: (i) Allowing user management of a fixed number of digital "tokens or "chips" that can be allocated to products in the marketplace, (ii) Tracking the purchasing behavior of consumers in the marketplace and correctly adding points to user point accounts in proportion to their token allocations within the marketplace, (iii) Allowing the users to browse, preview, and purchase products in fully enclosed embodiments of the Platform, (iv) Allowing users to track the performance of products to which they have allocated tokens, (v) Allowing users to compare their performance against other users of the Platform, (vi) Allowing product vendors to gamify their product marketplace, (vii) Allowing product vendors to track data related to token allocations within their gamified marketplace.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
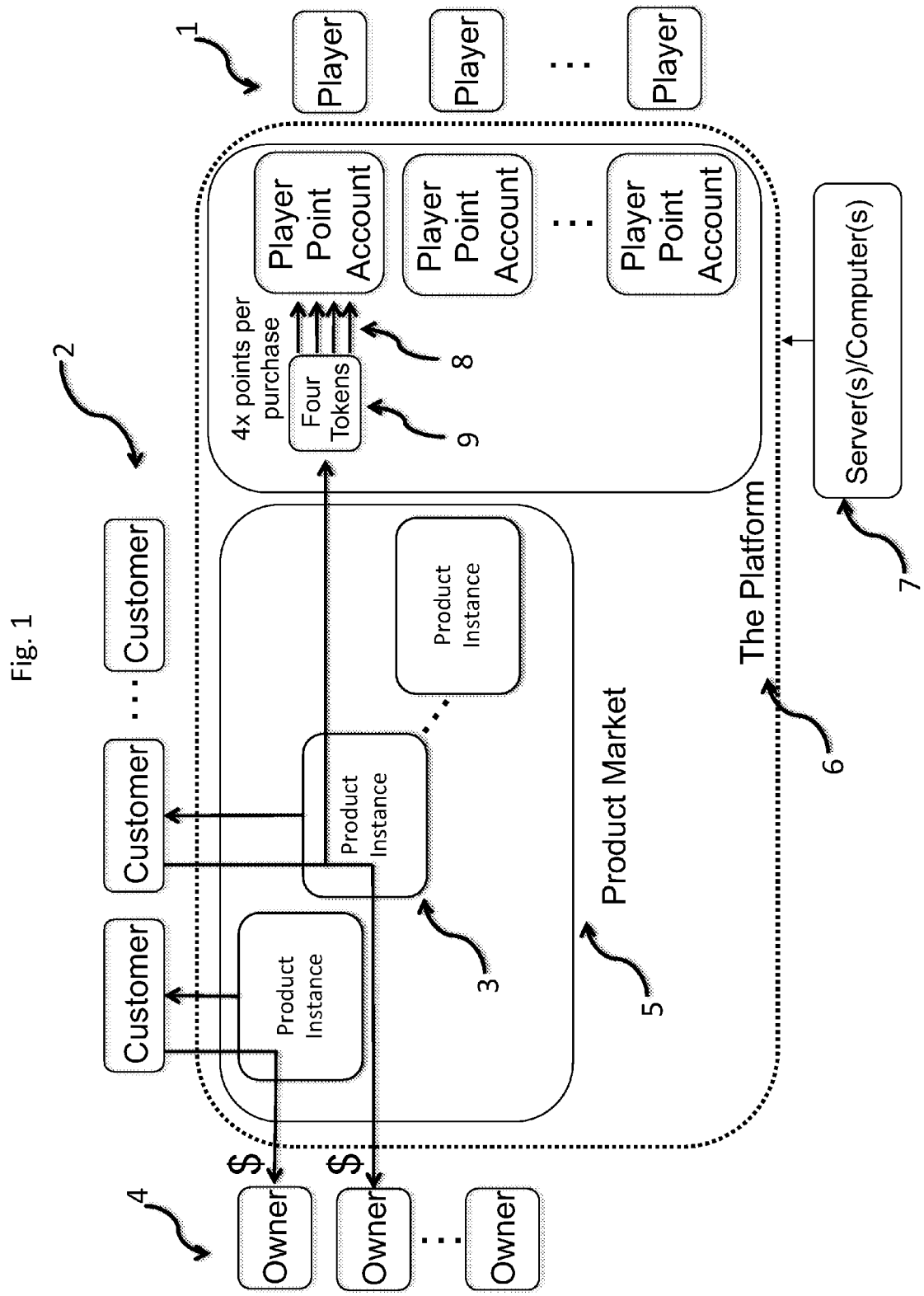
FIG. 1 conceptualizes the interaction between various categories of Users and the Product Market and Player Point Accounts that comprise the Platform. The Platform is fully integrated when the Product Market is controlled by the Platform (dashed boundary) and is passively integrated when market data is simply observed by the Platform and used to determine point distributions to relevant Players. The relationship between Consumer and a product Owner is shown, as is the relationship between a transaction within the Product Market and a subsequent point payment to a Player's Point Account as governed by the allocation of tokens within the Market.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

The present disclosure is related to a software Platform and method for an online marketplace whereby a plurality of users compete to make predictions about the purchasing behavior of a plurality of consumers in a (typically digital) marketplace. The disclosed method may be used to gamify nearly any product market where sales information can be tracked and aggregated.

The detailed descriptions that follow are presented, in part, in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory; rather they represent specific electronic structural elements, which impart a physical organization on the information stored in memory. More than mere abstraction, the data structures are specific electrical or magnetic structural elements in memory, which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein, which form part of the present disclosure; the operations are machine operations. Useful machines for performing the operations of the present disclosure include general purpose digital computers or other similar devices. In all cases the distinction between the method operations in operating a computer and the method of computation itself should be recognized. The present disclosure relates to a method and apparatus for operating a computer in processing electrical or other (e.g., mechanical, chemical) physical signals to generate other desired physical signals.

The present disclosure also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present disclosure deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions that may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several frequently used terms have specialized meanings in the present context. The term "object" relates to a set of computer instructions and associated data that can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output. The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a worldwide network of computers, namely the "World Wide Web" or simply the "Web". Examples of Browsers compatible with the present disclosure include the Internet Explorer program sold by Microsoft Corporation (Internet Explorer is a trademark of Microsoft Corporation), the Opera Browser program created by Opera Software ASA, the Safari browser program distributed by Apple, Inc., or the Firefox browser program distributed by the Mozilla Foundation (Firefox is a registered trademark of the Mozilla Foundation). Although the following description details such operations in terms of a graphic user interface of a Browser, the present disclosure may be practiced with text based interfaces, or even with voice or visually activated interfaces, that have many of the functions of a graphic based Browser.

Browsers display information formatted in a Standard Generalized Markup Language ("SGML") or a HyperText Markup Language ("HTML"), both being scripting languages that embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the style sheet formatting are separately contained (formatting may be thought of as methods of displaying information, thus an XML file has data and an associated method). Applets, small source code programs in a browser understandable programming language (for example, the Java programming language), may also be included in the web pages supplied to browsers. Web pages typically include one or more of these various files that the browser interprets and presents to the user.

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data (CDPD") used on the Advance Mobile Phone Service ("AMPS").

The terms "wireless application protocol" or "WAP" mean a universal specification to facilitate the delivery and presentation of web-based data on handheld and mobile devices with small user interfaces.

The current disclosure concerns a method whereby a plurality of Players (FIG. 1, 1) play a Game whose outcome is governed by the purchasing behavior of a plurality of Consumers (FIG. 1, 2) purchasing a plurality of Product Instances (FIG. 1, 3) from a possible plurality of Owners (FIG. 1, 4) through a Product Marketplace (FIG. 1, 5). The Game is effected by allowing Players to use the World Wide Web to access a website ("The Platform", FIG. 1, 6) stored on a computer/server system (FIG. 1, 7). The Product Marketplace may be an online venue for tracking transactions between Consumers and Product Owners or it may be a single point-of-sale (POS) system or a plurality of POS systems that track sales in a plurality of physical stores. Purchases of Product Instances through the Marketplace are monitored by software provided by The Platform and used to trigger "point payments" (FIG. 1, 8) to Players who, through the placement of digital "markers" or "tokens" controlled by The Platform (FIG. 1, 9), have indicated their belief that said products will be purchased by Consumers. All Players are given the same fixed number of tokens to attach to products and those Players who accumulate the most points over a fixed period of time are declared winners of the Game for said time period and may be eligible for prizes.

Figure 2:
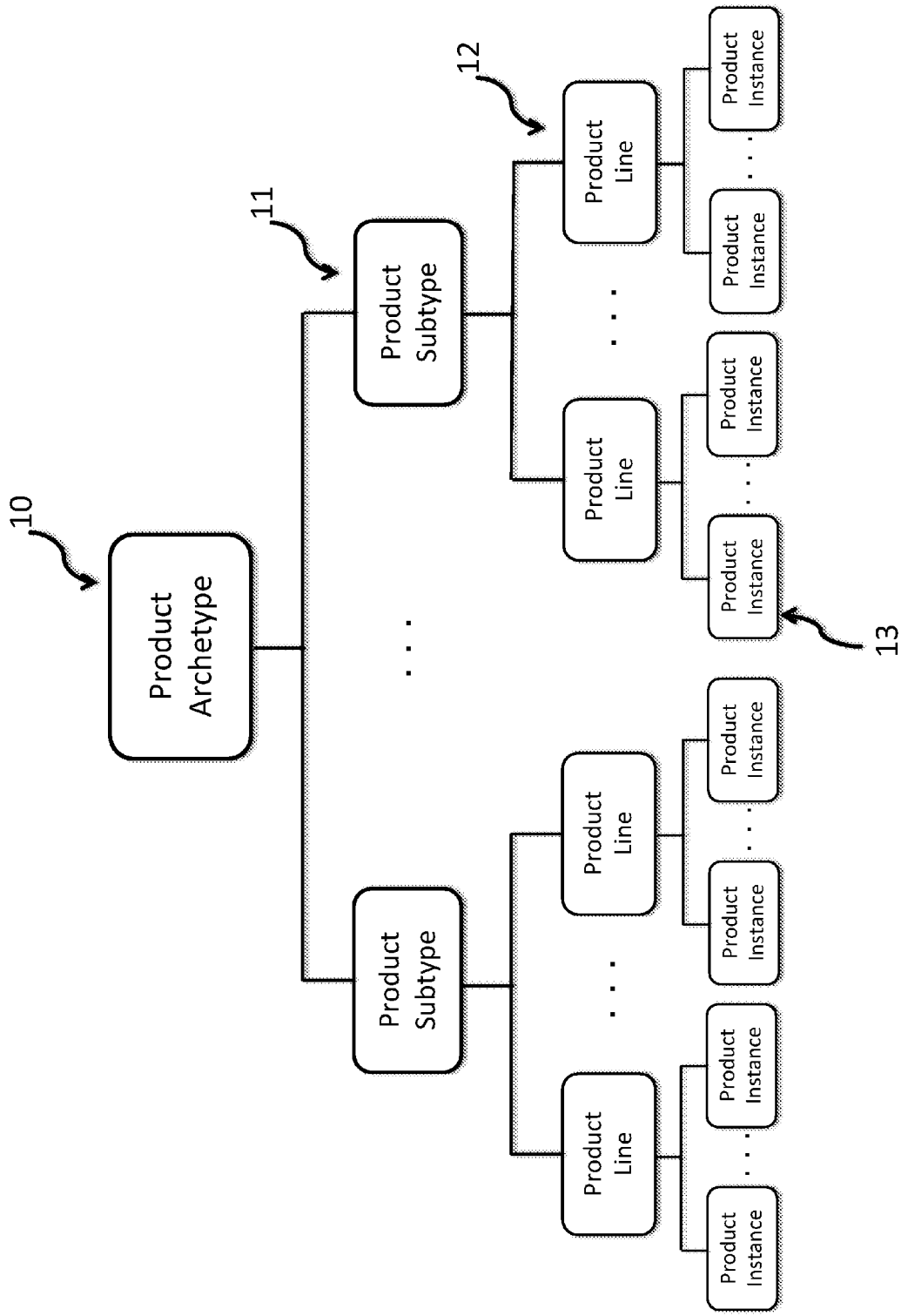
FIG. 2 illustrates the product hierarchy corresponding to products that can be easily gamified by the disclosed method and software platform.

The practice of attaching game mechanics and competitive goals to (typically online) consumer behaviors has been called "gamification". The present disclosure concerns a general method and software platform for "gamifying" product marketplaces that deal with products conforming to a specific set of characteristics; in particular, products that can be described by the following hierarchy: product archetype→product subtype→product line→product instance, as shown in FIG. 2. For example, books are a Product Archetype (FIG. 2, 10), crime novels are a Product Subtype or Genre (FIG. 2, 11), a specific title (e.g., Arthur Conan Doyle's "The Hound of the Baskervilles") is a Product Line (FIG. 2, 12), and a physical or digital copy of said book is a Product Instance (FIG. 2, 13).

Figure 3:
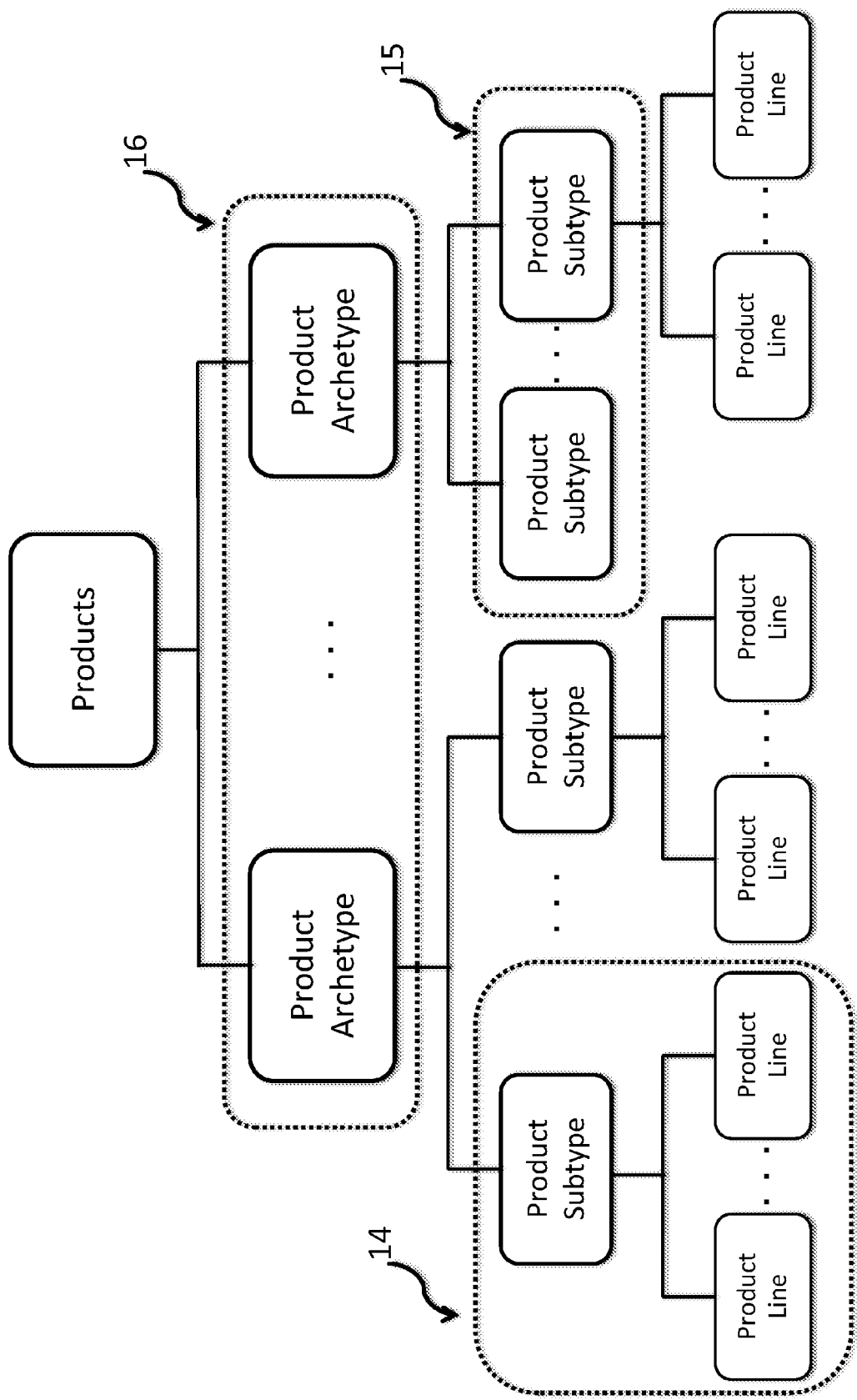
FIG. 3 illustrates the three modes by which products belonging to the hierarchy described in FIG. 2 may be gamified.

The disclosed gamification method may be used for Product Marketplaces where it is possible to sell many Product Instances of a Product Line. As shown in (FIG. 3, 14), the Game may be vertically integrated such that players compete to pick the best Product Lines from within a given Product Subtype (e.g., competing only within the Rap music genre), horizontally integrated across various Product Subtypes (FIG. 3, 15) within a Product Archetype (e.g., competing to pick best overall music album sales regardless of genre), or horizontally across Product Archetypes (FIG. 3, 16) as would be the case for the various products sold through, for example, a large retailer.

The Platform enables Players to assign digital tokens to products, manage their tokens over time (adjust their token portfolio), and keep track of points scored for them by said products. The Platform enables this functionality for any website selling products that fit the hierarchal description shown in FIG. 2. The Platform can be fully integrated, partially integrated, or passively integrated with existing Vendor web sites depending on the degree to which The Platform handles market making and product delivery.

Figure 4:
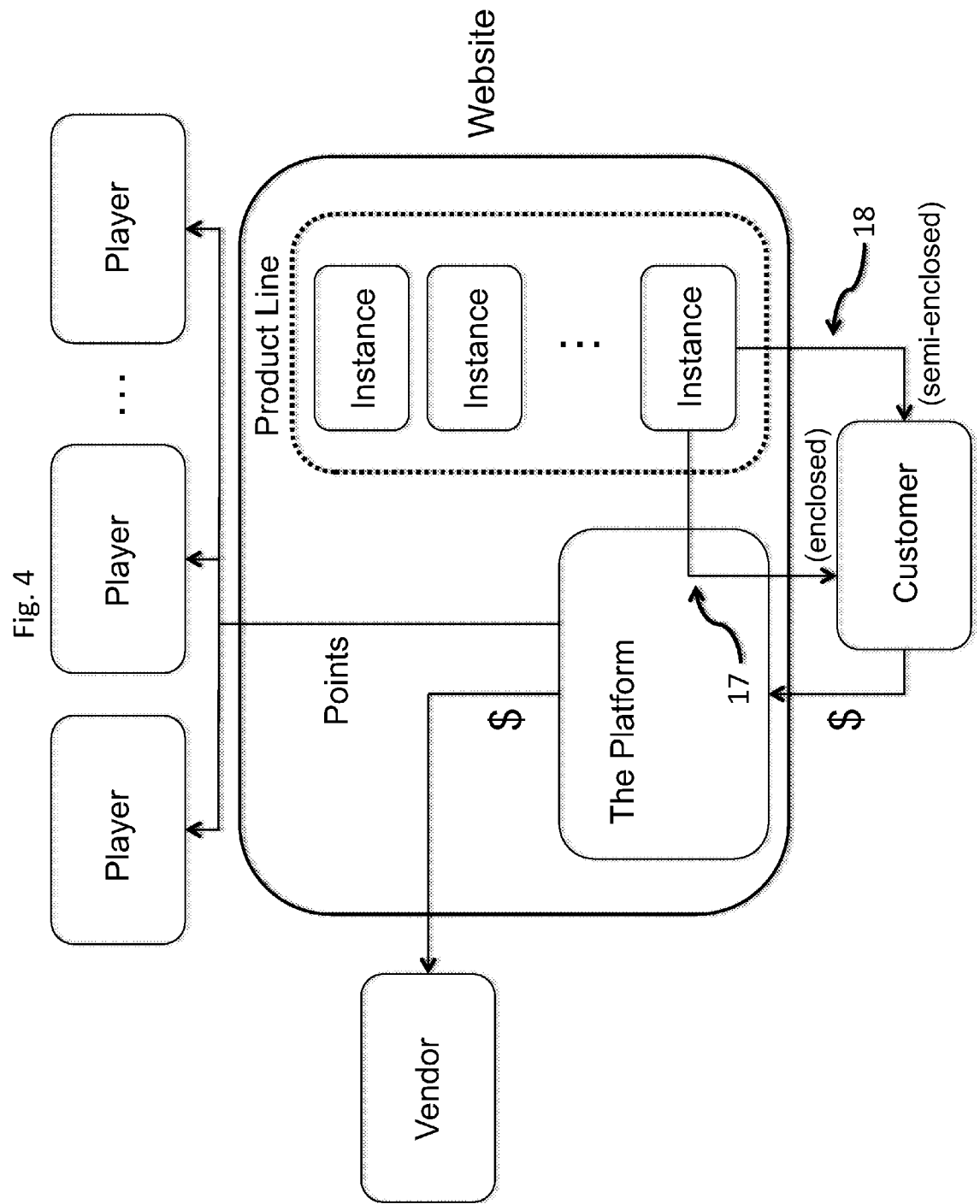
FIG. 4 shows two methods (enclosed and semi-enclosed) by which the Platform may be used to gamify a Product Market.
Figure 5:
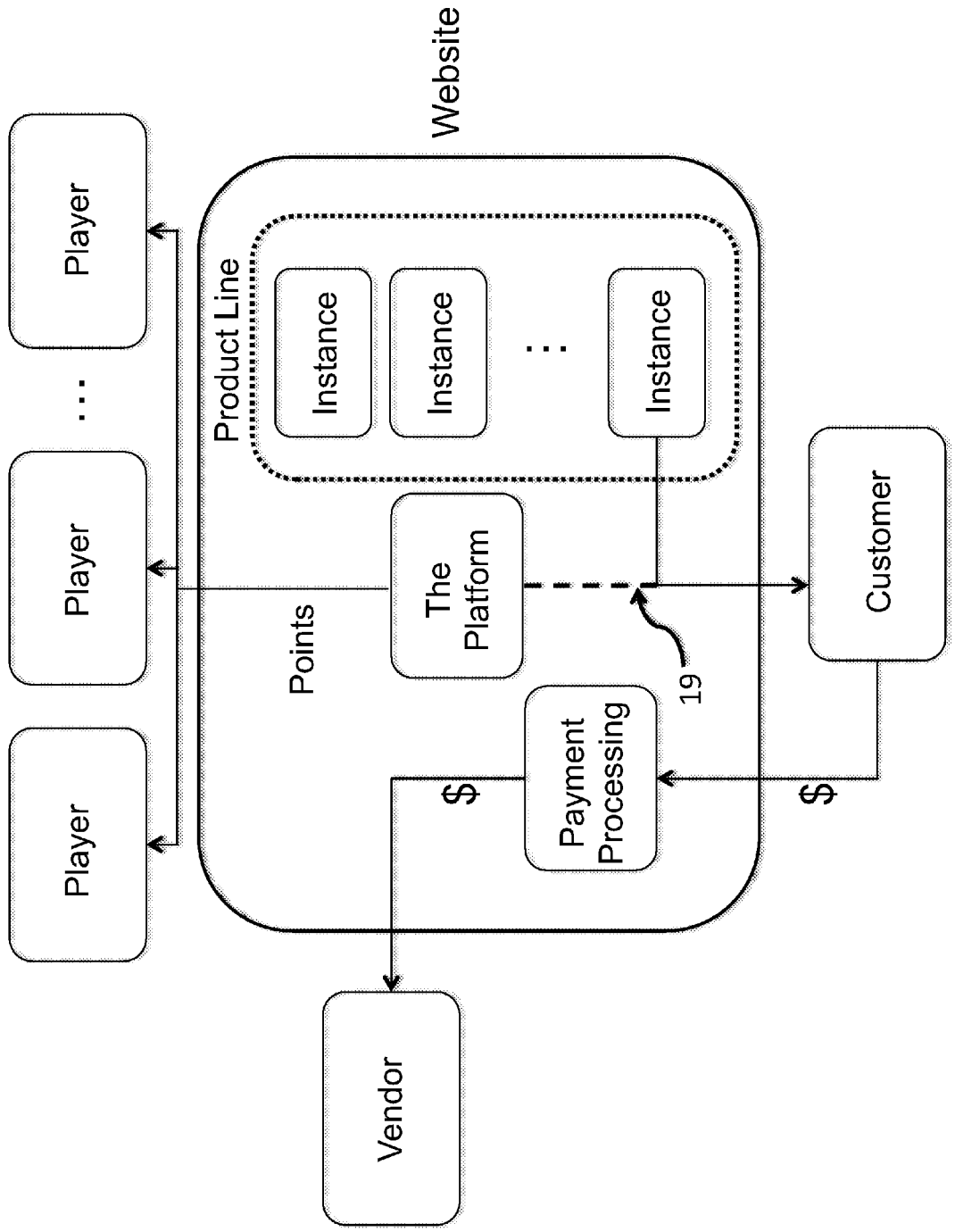
FIG. 5 shows one method (passively integrated) by which the Platform may be used to gamify a Product Market.

When both market making and product delivery are effected through The Platform it is enclosed and fully integrated with the Vendor site (FIG. 4, 17). The Platform is semi-enclosed and partially integrated (FIG. 4, 18) when product delivery is performed by a third party (e.g., the Vendor). When neither payment nor delivery is handled by The Platform, it is passively integrated with the Vendor site. In this case, The Platform passively receives information (FIG. 5, 19) about product sales such that points can be appropriately apportioned among Players. A new online bookseller might desire the fully integrated solution, a brewery seeking to gamify their online sales might desire the partially integrated solution, and an established site such as a large online retailer could passively integrate The Platform.

In other words, the product marketplace need not be contained within The Platform, but, in one embodiment, the algorithms and webpages comprising The Platform: (1) enable consumers to allocate and deallocate tokens to product lines in a marketplace, (2) track, or receive report of, the sale of a plurality of products through said marketplace, (3) proportionally allocate a plurality of points to a plurality of Players according to the particular allocation of a plurality of tokens, (4) allow a plurality of Players to track their points over time, and (5) allow a plurality of Players to compare their performance against a plurality of other Players.

What follows is a description of a fully integrated, enclosed embodiment of The Platform in which the Product Owners are Musicians and a Product Line is a music album or song and digital copies of such are Product Instances. In what follows, Consumers are also called Listeners and tokens are called chips.

Figure 6:
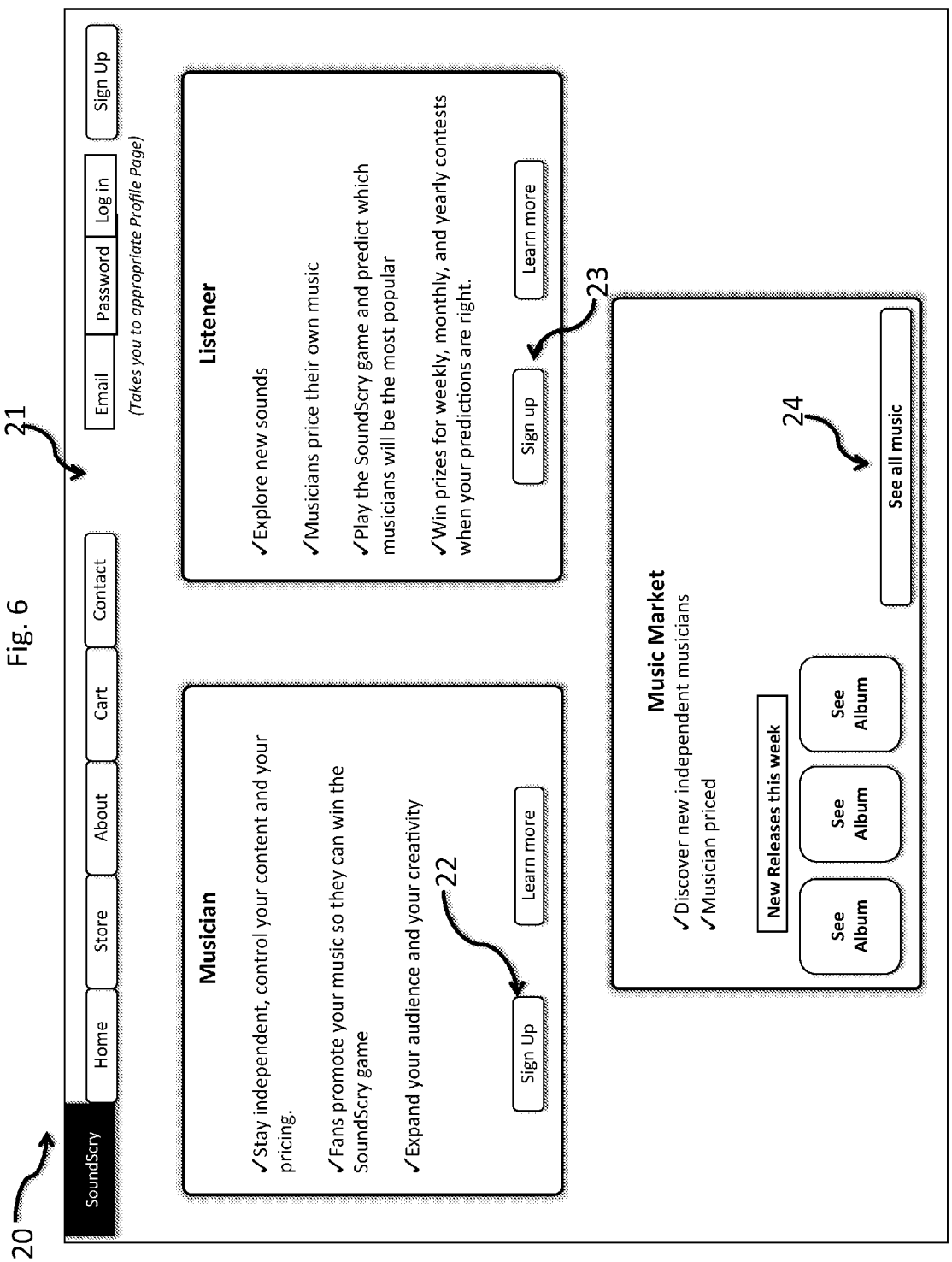
FIG. 6 illustrates the starting page of an embodiment of The Platform that engages Users as Musicians and Listeners and provides a fully enclosed music marketplace in addition to a Game in which Listeners/Players predict which music albums will sell best by assigning chips to said albums.

Referring now to the drawings, FIG. 6 illustrates starting web page 21 of website 20 which is a music-centric embodiment of The Platform that has been previously described herein. That is to say, The Platform is understood to be comprised of the software, algorithms, and databases that enable Users to become Players who interact with a Product Market and place tokens ("chips") on Products to indicate their belief that those Products will be sold and to appropriately apportion points to Players according to their deployed tokens. Website 20 may be a collection of a plurality of web pages, including web page 21 and an embodiment of The Platform. Website 20 may also have web pages that are specific to managing digital music and it should be understood that any specificity provided herein does not limit the scope of the disclosure.

While this exemplary embodiment is described as a web-based system, systems utilizing dedicated software and/or standalone machines may alternatively be implemented. Such a web-based system uses a server computer (not shown) and a user computer or other device (not shown). The server computer is connected to a network, for example, the World Wide Web and responds to queries from user computers. The server either stores or is able to retrieve or build various web pages to be sent to the multiple user computers that are likewise coupled to the network. Accordingly, the server transmits HTML code or other web page files for the below described web pages to the user computer. The user computer has a browser program which may be proprietary software used only for interacting with the server, or may be a more generic browser capable of viewing many different websites and interacting with multiple servers. Alternatively, instead of a user computer, a wireless device such as a PDA or smart phone may be used to receive the web pages and interact with the user. For stand-alone implementations, a single computer has access to both the information of the server and the graphic files for the user interface, and the interaction capability of similar to that of a browser. In other embodiments not described otherwise herein, a combination of local software and network assessable resources may be combined to provide the full functionality similar to the web-based system.

Figure 7:
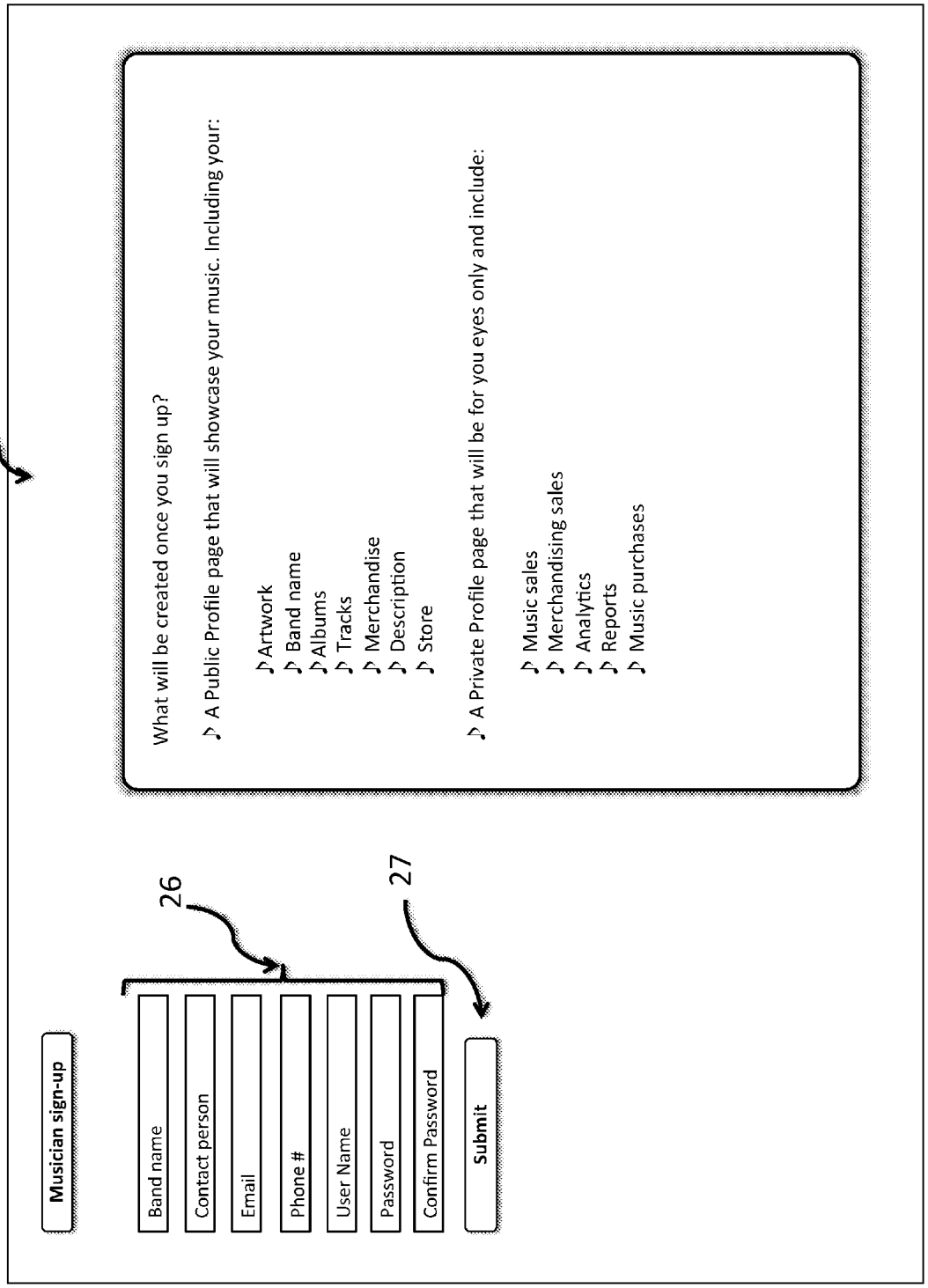
FIG. 7 shows a beginning Musician sign-up page accessed from the starting web page shown in FIG. 1.
Figure 9:
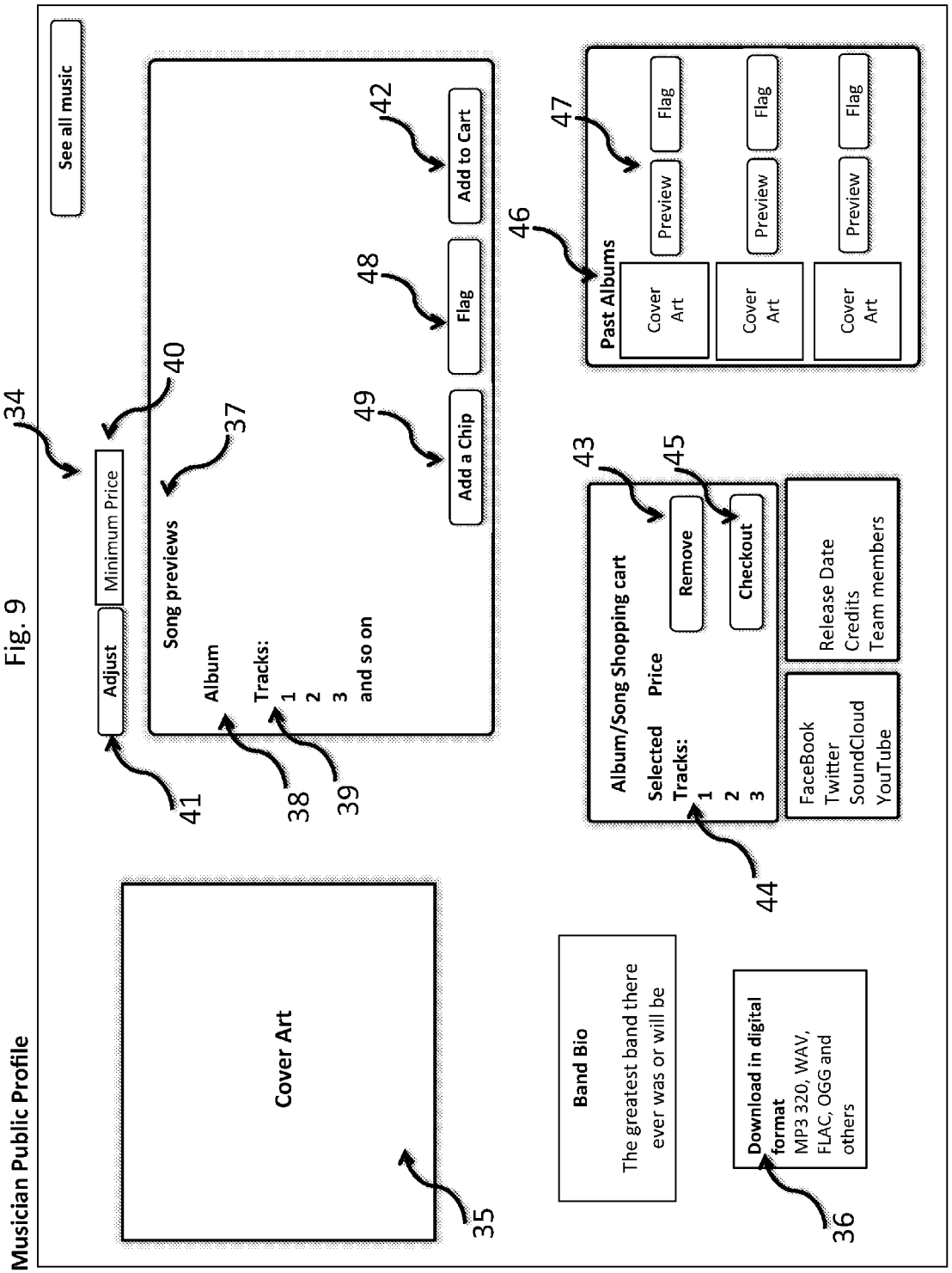
FIG. 9 shows a Musician's public profile page where music may be purchased by other Users.

A User may become a Musician by selecting button 22, which leads to the web page 25 shown in FIG. 7. Web page 25 leads the User through a data acquisition process 26, which upon completion identifies the User as a Musician. Once the User has submitted their information by selecting 27 they are taken to their private profile page (not shown) where they can choose artwork to represent their albums, edit their bio, upload album tracks, price album tracks, and so forth. Where they can, in short, manage what will be displayed on their public profile page (FIG. 9).

Figure 10:
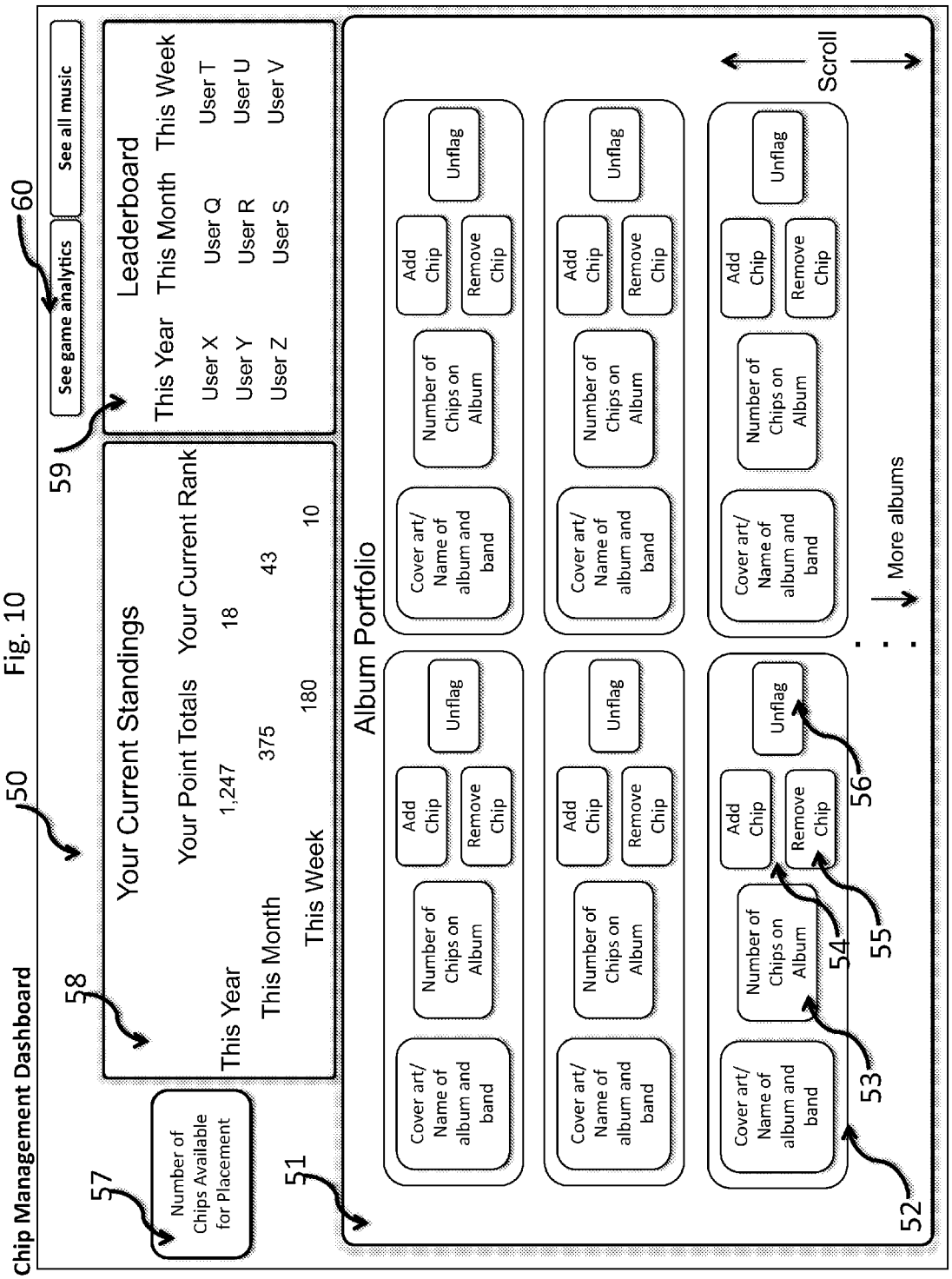
FIG. 10 shows a Listener's chip management dashboard where they manage the allocation of their chips on albums within their Portfolio and where information concerning their standing relative to other Players in the Game is presented.
Figure 11:
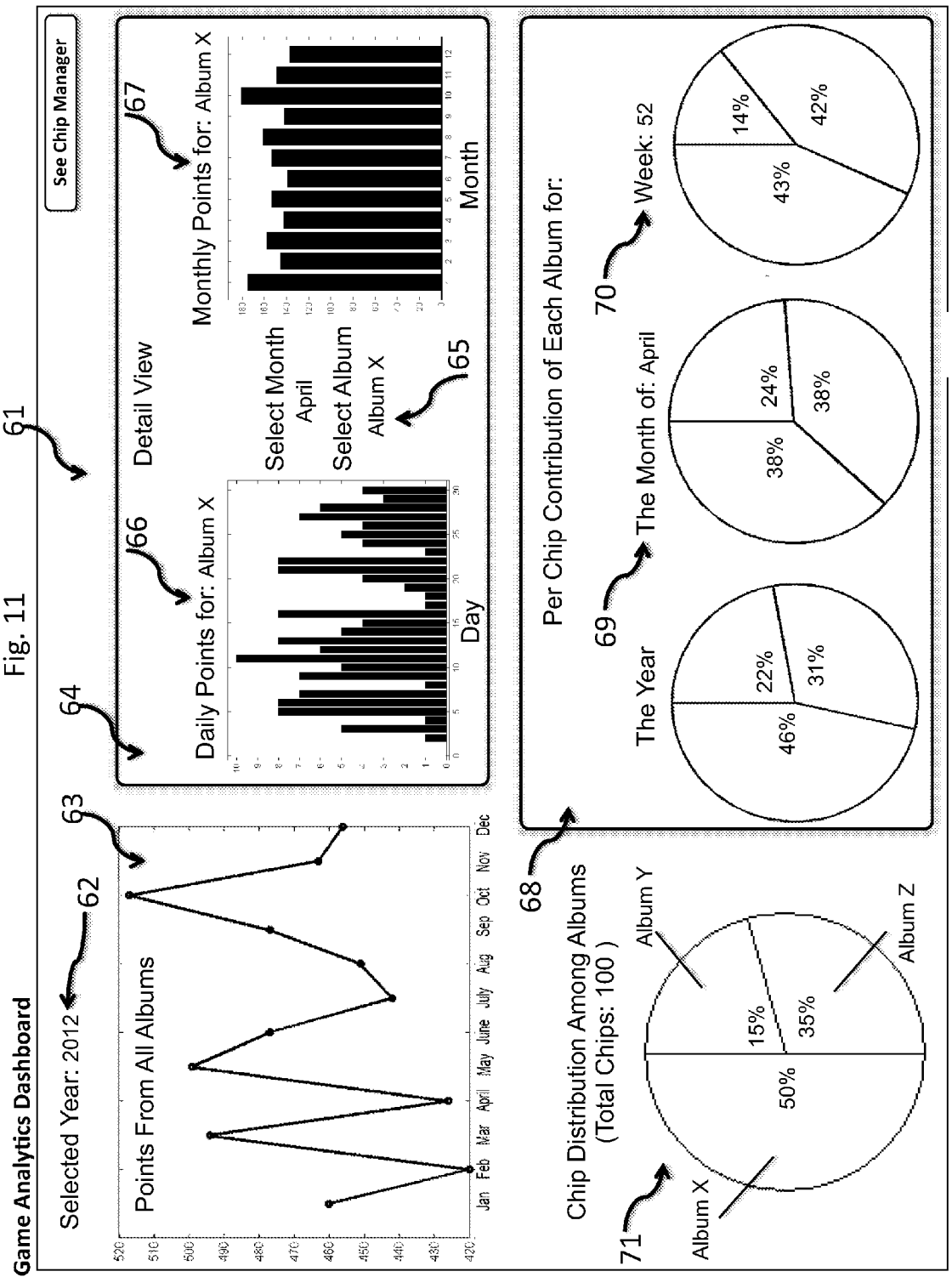
FIG. 11 shows a Listener's Game analytics dashboard where they are able to track data pertaining to the performance of albums to which they've allocated chips in the Game.

Selecting 23 from home page 21 links the User to a sign-in page (not shown) where they may become a registered Listener. A registered Listener is provided with a personal profile page (not shown) where they can review music that they have purchased. They are also automatically registered as a Player and provided with a "chip" management dashboard (FIG. 10) where they can play the Game by adjusting their allocation of chips in the market.

Figure 8:
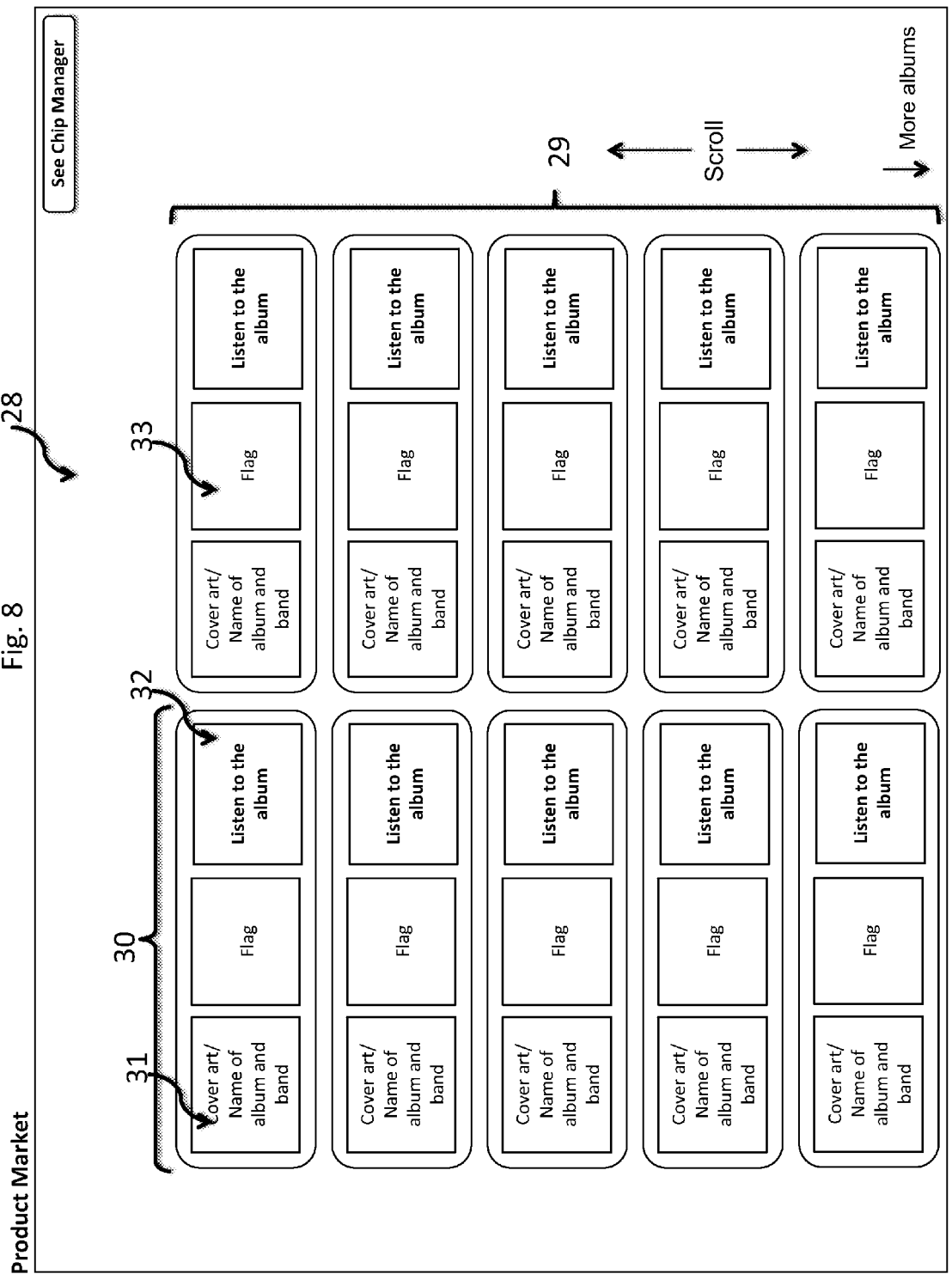
FIG. 8 shows the Product Market where Users of The Platform may browse summaries of pertinent information regarding albums offered for sale by Musicians and navigate to Musicians' public pages (FIG. 9) and/or add the album to their Game Portfolio (FIG. 10).

Selecting 24 from home page 21 links a User directly to the Product Market 28 shown in FIG. 8. The User may use the active, scrollable window to browse the plurality of albums (29) that are for sale from the plurality of Musicians within the web site 20. Each individual album representation (30) within the market displays a thumbnail of an image (31) that was uploaded by the Musician from their private profile page. Selecting 32 takes the User to the Musician's public profile page 34 (FIG. 9).

The cover art displayed in window 35 corresponds to the album that was selected by the User from the Product Market 28 (FIG. 8). The User may choose the format of the digital music they will download by selecting 36 which activates a pop-up dialogue box (not shown) that allows the User to select from a list of available download formats. The User may sample individual songs from the album by selecting from the list of tracks (39) that are shown in the preview window 37. When a track is selected for sampling the minimum price for that song, as determined by the Musician, displays in 40. If the album button 38 is selected, the minimum price for the entire album will display in 40. The User/Listener may elect to offer more money for each song/album by selecting 41, which opens the pop-up dialogue box (not shown) where they may enter a new price for the track/album and add the track/album to the shopping cart 43 with the appropriate updated price. Alternatively, the User may elect to directly add a track/album to the shopping cart for the minimum requested price by selecting 42. A list of tracks/albums selected for the shopping cart is provided (44). Selecting 45 links to a standard payment-processing page (not shown) where payment information may be entered. A download manager (not shown) allowing the User to select a download location on their hard drive is activated once payment has been received. The User may browse other albums generated by the same Musician in the active, scrollable window 46. The User may preview tracks from these other albums by selecting the appropriate button 47, which updates the cover art 35 and the preview window 37 with information corresponding to the selected album.

A User who has signed up to become a Listener/Player may select 48 to "flag" (add) the album to their Album Portfolio (FIG. 10, 51) shown on their chip management dashboard 50. They may also choose to add a chip to an album that is already in their Portfolio by selecting button 49. Albums can also be flagged for the Player's Portfolio directly from the Product Market (FIG. 8, 33). All albums that the Player has flagged or allocated chips to can be viewed through the scrollable window 51. Each representation of an album in the Portfolio (e.g., 52) allows the Player to see how many chips are on the album (53), add chips (54), remove chips (55), or remove the album from the Portfolio entirely (56). As the number of chips on albums in the Portfolio is adjusted up or down the display (57) of the total number of chips available to the Player is proportionally adjusted. The active window 58 provides the Player with real-time updates of the number of points they've accumulated for each contest time period and their rank within that contest time period. The active window 59 provides a real-time leaderboard for each of the contest time periods.

Selecting 60 takes the Player to the game analytics dashboard 61, where data pertinent to the game may be explored. After selecting the year of interest (62) the available charts and graphs are populated with the data of interest. An overview of total monthly point performance is provided in window 63. More detailed information may be displayed in window 64 where the month and album may be selected (65) for a daily (66) and monthly (67) breakdown of point totals. The per chip contribution of each album is overviewed in window 68 which tells the Player which albums were most productive over various contest time periods. Specific monthly and weekly performance numbers for all albums in the Portfolio may be queried by selecting the relevant time periods (69 and 70, respectively). The current breakdown of albums in the Portfolio is displayed in 71 if the year selected in 62 is the current year. The types of information so described are understood to be a representative example within the embodiment and are not meant to limit claims.

Figure 12:
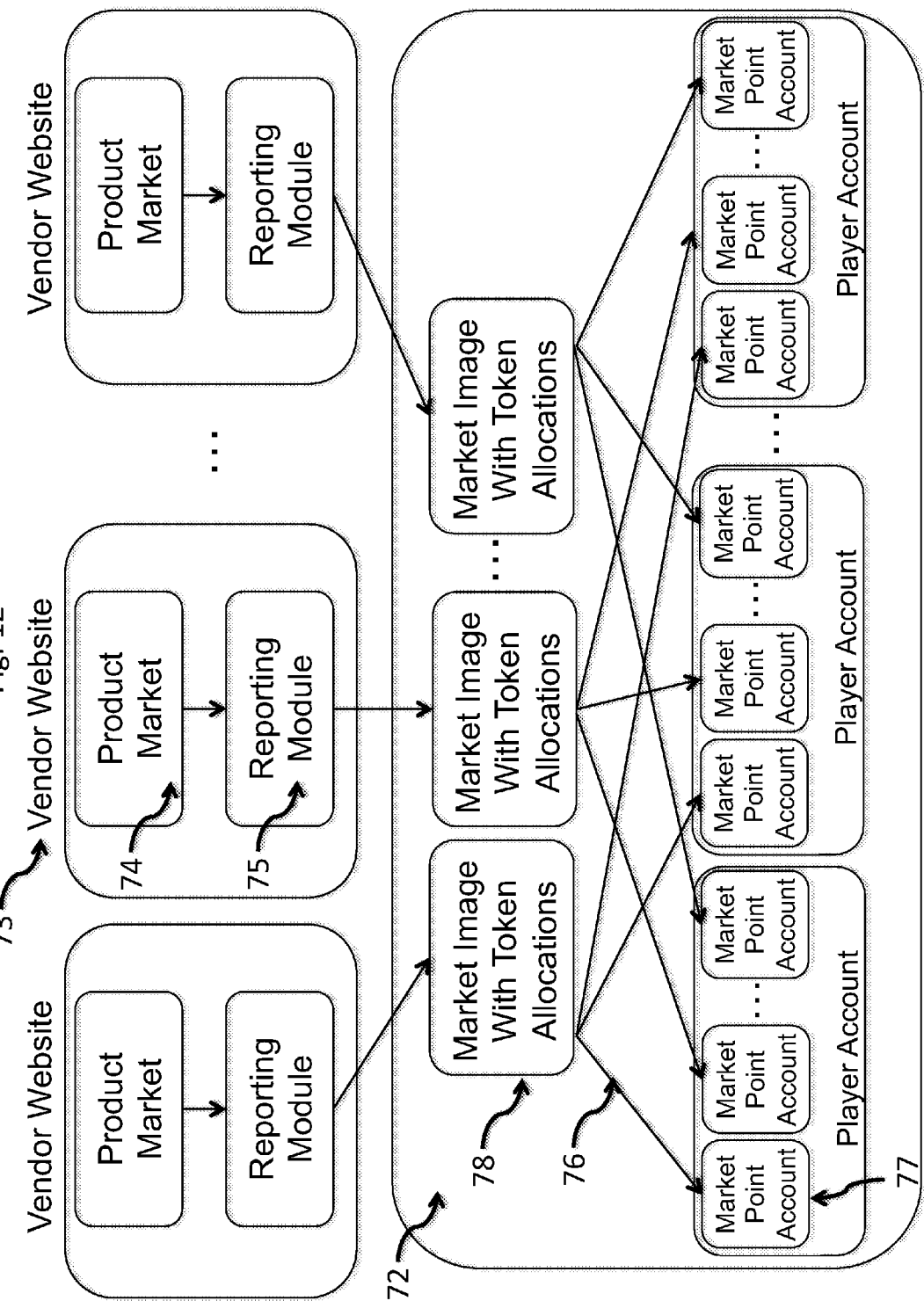
FIG. 12 conceptualizes a possible embodiment of the Platform in which a plurality of third-party Vendor websites each containing at least one Product Market provide market information to the Platform via a plurality of Reporting Modules that allow the Platform to distribute points among a plurality of Players each of whom may be engaged in a plurality of Games governed by the Platform.

Another embodiment of the Platform allows for general gamification of any product market where purchasing data can be monitored by the Platform. Enclosed product markets can clearly be monitored as market making is performed by the Platform. FIG. 12 illustrates a generalized scheme where all product markets are passively integrated with the Platform 72. A plurality of Vendor websites 73 each comprised of at least one product market 74 each communicate with the Platform via a Reporting Module 75 that monitors purchases within the Platform. A Reporting Module may be part of the Platform or it may be a set of software custom-generated by the Vendor or it may be a set of software generated by the Vendor using an Application Programming Interface (API) exposed by the Platform; regardless, a Reporting Module provides details (e.g., time, amount, which products) to the Platform about each purchase made within the Product Market resident on the Vendor's website. The provided information is used by the Platform to trigger a plurality of point payments (e.g., 76) to the plurality of Point Accounts corresponding to that Game (e.g., 77) for the plurality of Players with at least one token assigned to any products comprising the purchase reported by the corresponding Reporting Module. As shown in FIG. 12, Players indicate their preferences by placing tokens on products within a "mirror", "image", or "copy" of the Product Market that is resident on the Platform (78). In a fully enclosed embodiment the Product Market would itself be resident on the Platform and customers would purchase directly from said Market. Hybrid embodiments where purchases may be made either from within the Product Market Image or directly from the Vendor Product Market are conceivable. An embodiment where an augmented Reporting Module also maintains information about Player tokens is also possible. In such an embodiment, Players might assign tokens to products by, for example, "right-clicking" on a product within the Vendor Product Market and engaging with an augmented "token-assignment" menu. In all embodiments, some means of indicating Player estimates of product desirability is provided with point payments to Player Point Accounts corresponding to said assignments triggered by relevant activity within the Product Market.

Figure 13:
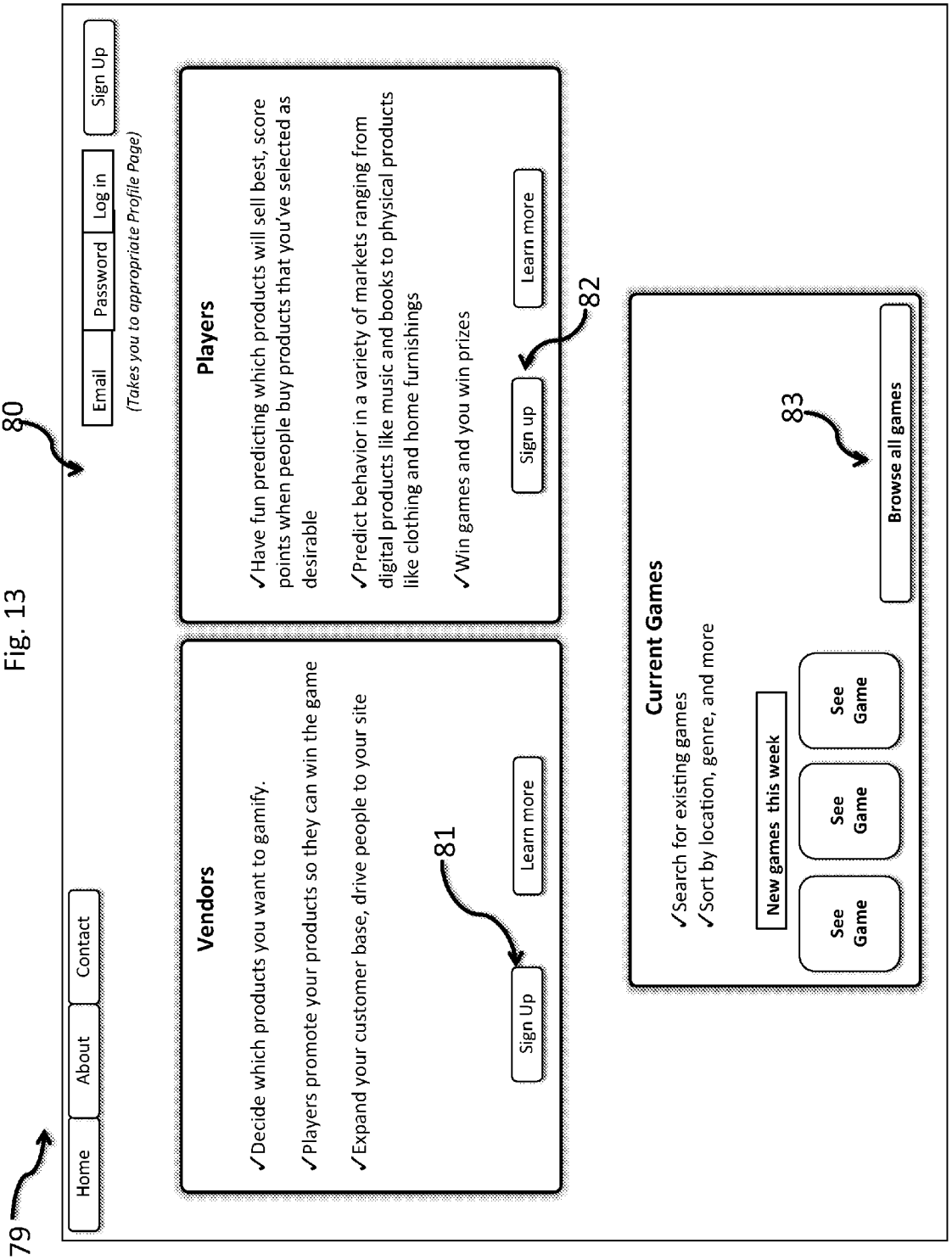
FIG. 13 illustrates the starting page of an embodiment of The Platform that engages Users as Vendors and Players and provides a means for a plurality of Vendors to generically gamify their Product Markets and a plurality of Players to engage with a plurality of Games created by said Vendors.

A representative embodiment of the concepts described by FIG. 12 begins with FIG. 13 which illustrates starting web page 80 of website 79 representing a generalized Game management system for a plurality of Games driven by a plurality of Product Markets. That is to say, in this embodiment the Platform is understood to be comprised of the software, algorithms, and databases that enable Users to become Players who interact with various Product Markets and place tokens on Products to indicate their belief that those Products will be sold and to appropriately apportion points to Players according to their deployed tokens. Website 79 is a collection of a plurality of web pages, including web page 80 and an embodiment of the Platform.

Figure 14:
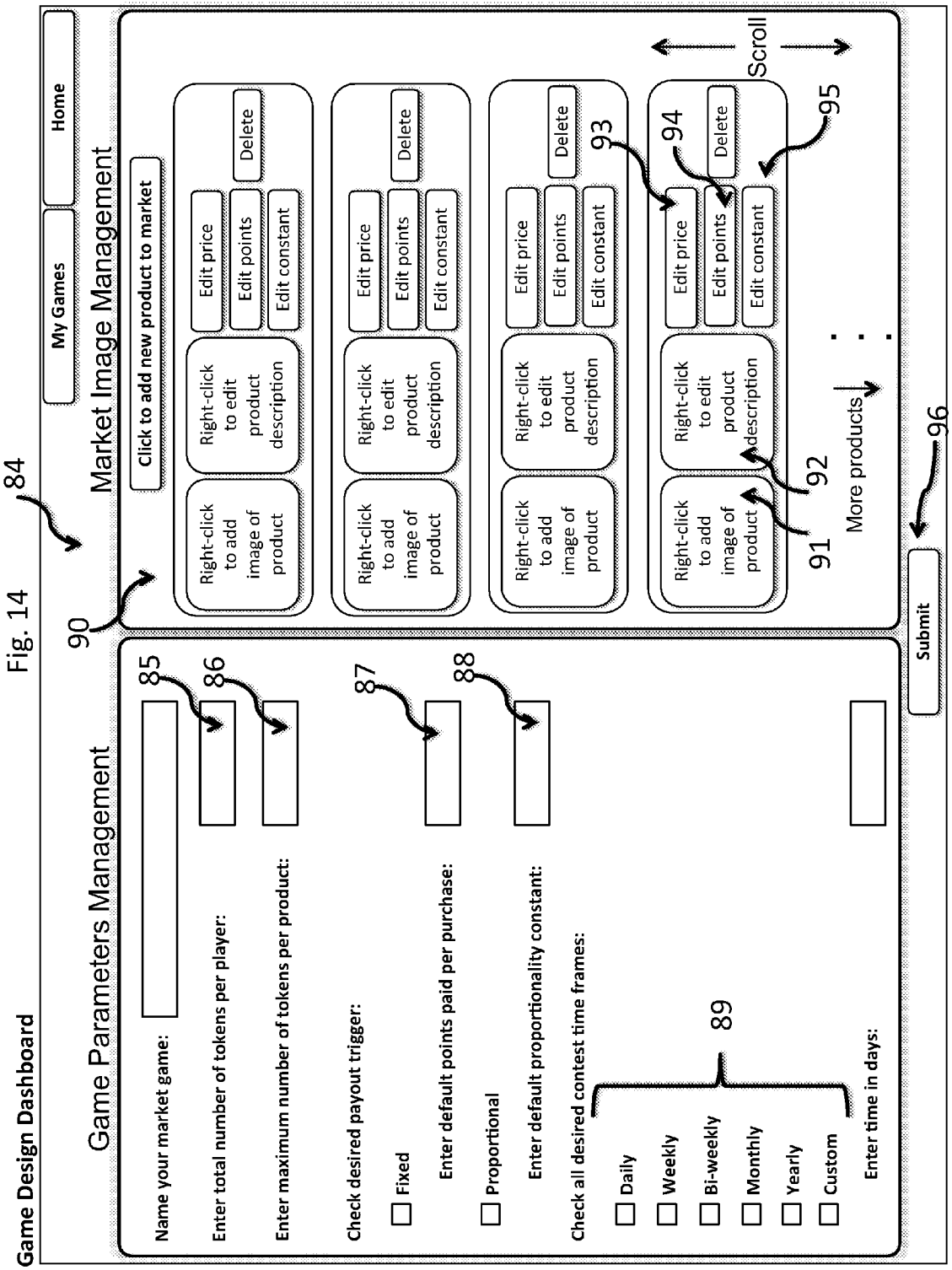
FIG. 14 shows a Vendor's Game management dashboard where they design the parameters that govern their Game and decide which products they will gamify by adding said products to a Market Image with which Players will engage in order to allocate tokens.
Figure 16:
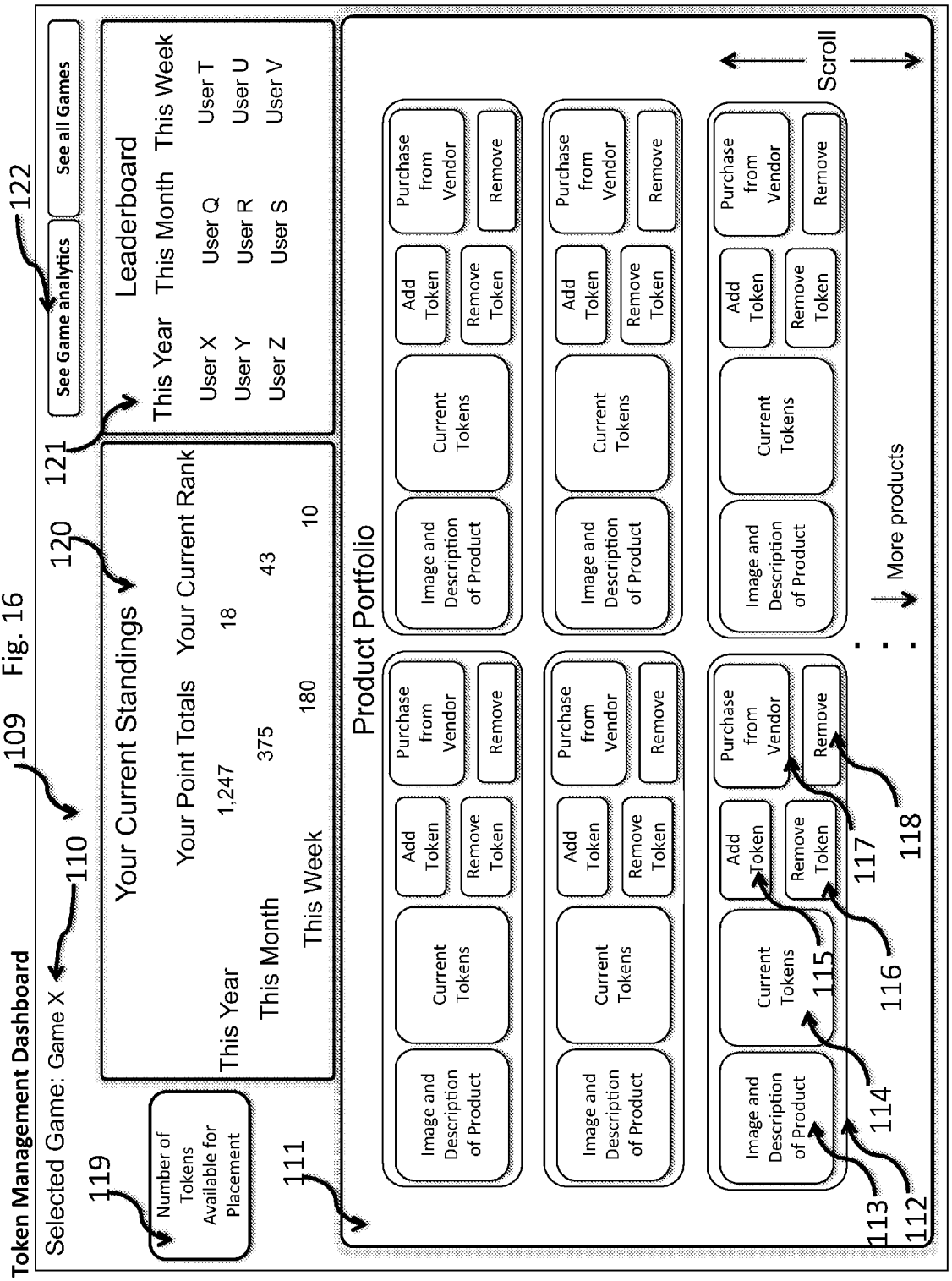
FIG. 16 shows a Player's token management dashboard where they manage the allocation of their tokens on products within the Portfolios associated with the Games they are playing and where information concerning their standing relative to other Players in said Games is presented.

A User may become a Vendor by selecting button 81, which leads to a web page (not shown) that leads the User through a data acquisition process, which upon completion identifies the User as a Vendor. Once the User has submitted their information they are provided with access to a Game Design Dashboard (FIG. 14, 84) where they can design Games linked to their Product Market(s). The Vendor chooses Game parameters such as how many tokens they want each Player to have (85), the maximum number of tokens that can be placed on any one product (86), whether the payout trigger is tied simply to purchases (87) or whether it is proportional to product price (88), and selects the time frames over which the Game is played (89). They also decide which products they want to gamify by building an Image of their Product Market (90). The Vendor can decide what image (91) and description (92) will be displayed to Players when they are placing their tokens in the Market Image and can edit the price (93), the points paid per token for a "fixed" payout trigger (94), and what proportionality constant will be used for payouts (95) when using a "proportional" payout trigger. The Vendor submits their Game (96) when they are satisfied with the Market Image and the Game parameters. Upon submission and acceptance, the Game becomes searchable within the Games Browser (FIG. 18, 136) where Players can then access the corresponding Market Image (FIG. 19, 146) and choose products to add to their Portfolio for that Game (FIG. 16, 111). Software and algorithms within the Platform establish a link and a mapping between the generated Market Image and data reported about its active representation within the Vendor's website as governed by how the Reporting Module (FIG. 12, 75) has been designed (if passively integrated).

Figure 15:
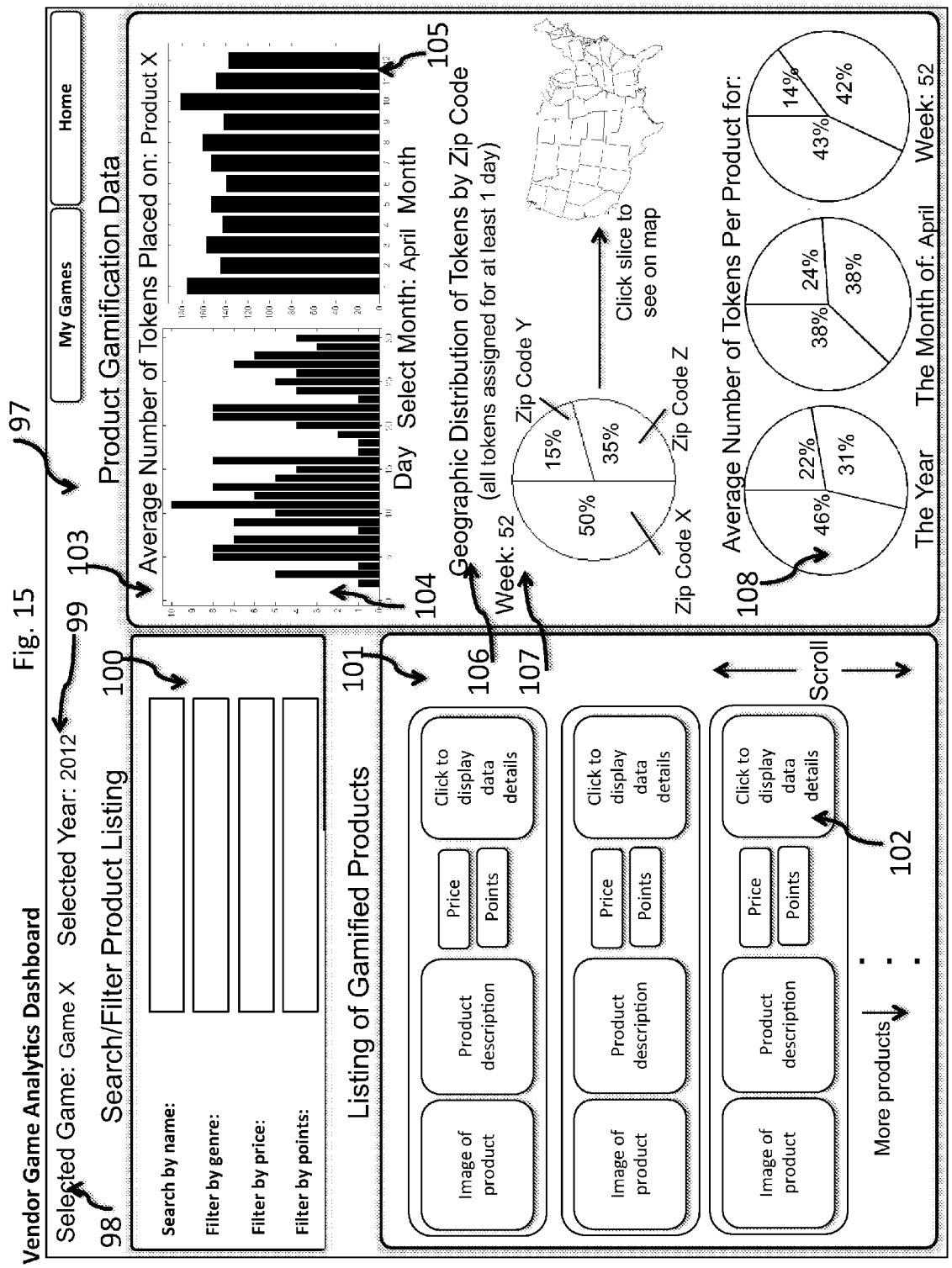
FIG. 15 shows a Vendor's Game analytics dashboard where they are able to track data pertaining to the allocation of tokens to the gamified products in their Market.

Each Vendor also has access to a Game Analytics Dashboard (FIG. 15, 97) where they can view data that is pertinent to their Games. After selecting a Game and time period of interest (98, 99) they can search (100) or browse (101) the corresponding Market Image for a product whose data they would like to investigate. Selecting a product (102) populates the Data Detail Window (103) with information pertinent to that product. Information of interest includes, but is not limited to, the total number of tokens assigned to the product by all Players by day (104) and by month (105), the number of Players per zip code who have kept a token on the product for at least a day (106) over a given time period (107), and a percentage breakdown (108) of how many tokens were assigned to each product out of the average total tokens assigned to the Game over a given time frame. Clearly, data regarding token assignments by Players of the Game provides valuable market intelligence to the Vendor.

Figure 17:
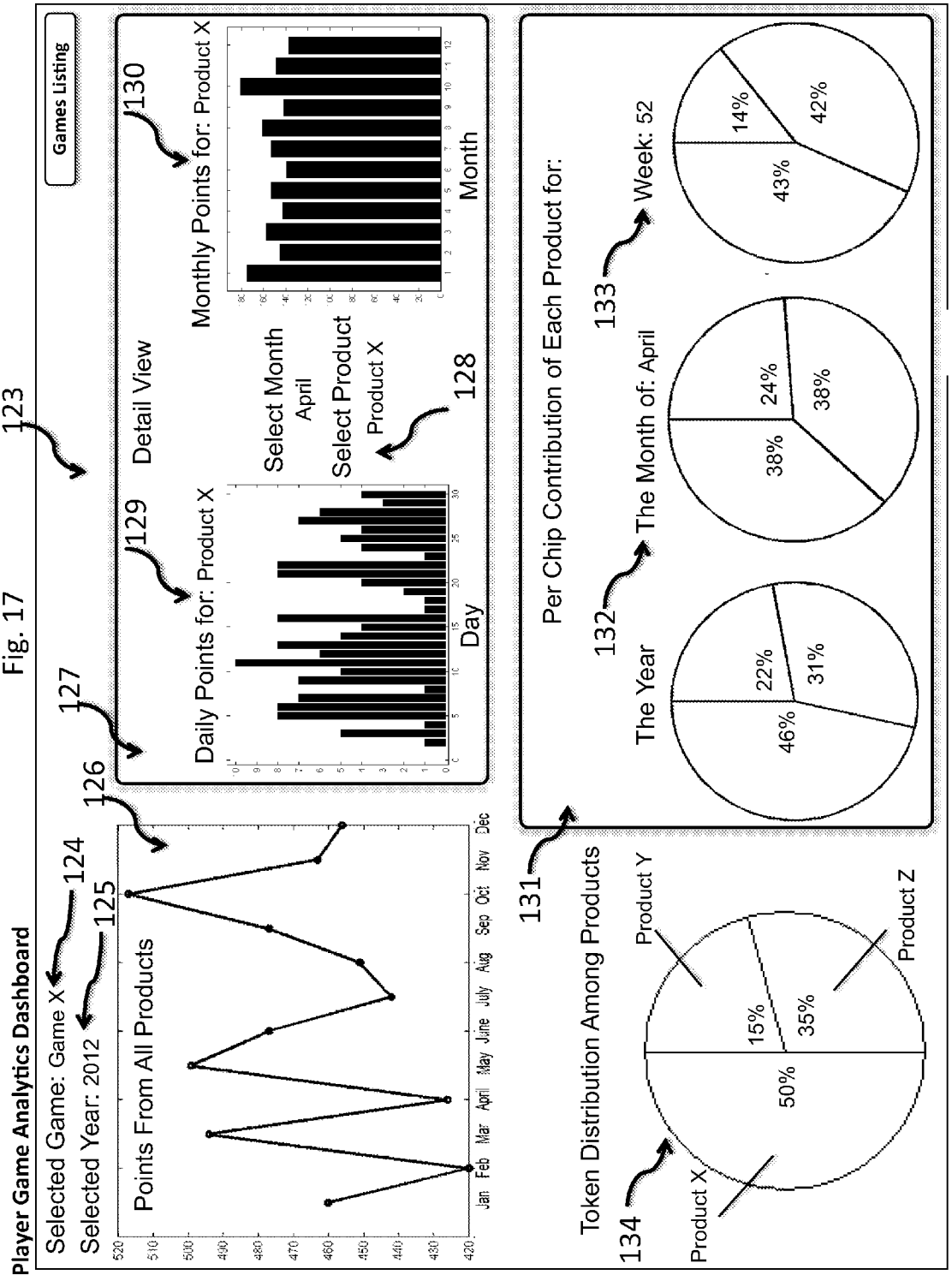
FIG. 17 shows a Player's Game analytics dashboard where they are able to track data pertaining to the performance of products to which they've allocated tokens in their Games.

Selecting 82 from home page 80 links the User to a sign-in page (not shown) where they may become a registered Player. A registered Player is provided with a Token Management Dashboard (FIG. 16, 109) where they can review Games that they are playing and manage their allocation of tokens within each. They are also provided with a Game Analytics Dashboard (FIG. 17, 123) where they can monitor their performance within each Game so they can decide how they want to adjust their Product Portfolios.

A Player's Token Management Dashboard allows them to select the Game they want to manage 110 after which all information relative to that Game is displayed in the dashboard. All products that the Player has added to their Portfolio can be viewed through the scrollable window 111. Each representation of a product in the Portfolio (e.g., 112) provides an image and a description 113 of the product and allows the Player to see how many tokens are on the product 114, add tokens 115, remove tokens 116, buy the product 117 (by clicking through to original Market on Vendor site or through the Platform if enclosed), or remove the product from the Portfolio 118. As the number of tokens on products in the Portfolio is adjusted up or down the display (119) of the total number of tokens available to the Player for this Game is proportionally adjusted. The active window 120 provides the Player with real-time updates of the number of points they've accumulated for each contest time period in the selected Game and their rank within that contest time period. The active window 121 provides a real-time leaderboard for each of the contest time periods in the selected Game.

Selecting 122 takes the Player to the Game Analytics Dashboard (FIG. 17, 123), where data pertinent to their Games may be explored. After selecting the Game and the year of interest (124, 125) the available charts and graphs are populated with the data of interest. An overview of total monthly point performance is provided in window 126. More detailed information may be displayed in window 127 where the month and product may be selected 128 for daily 129 and monthly 130 details of point totals. The per token contribution of each product is overviewed in window 131 which tells the Player which products were most productive over various contest time periods. Specific monthly and weekly performance numbers for all products in the Portfolio may be queried by selecting the relevant time periods (132 and 133, respectively). The current makeup of products in the Portfolio is displayed in 134 if the year selected in 125 is the current year. The types of information so described are understood to be a representative example within the embodiment and are not meant to limit claims.

Figure 18:
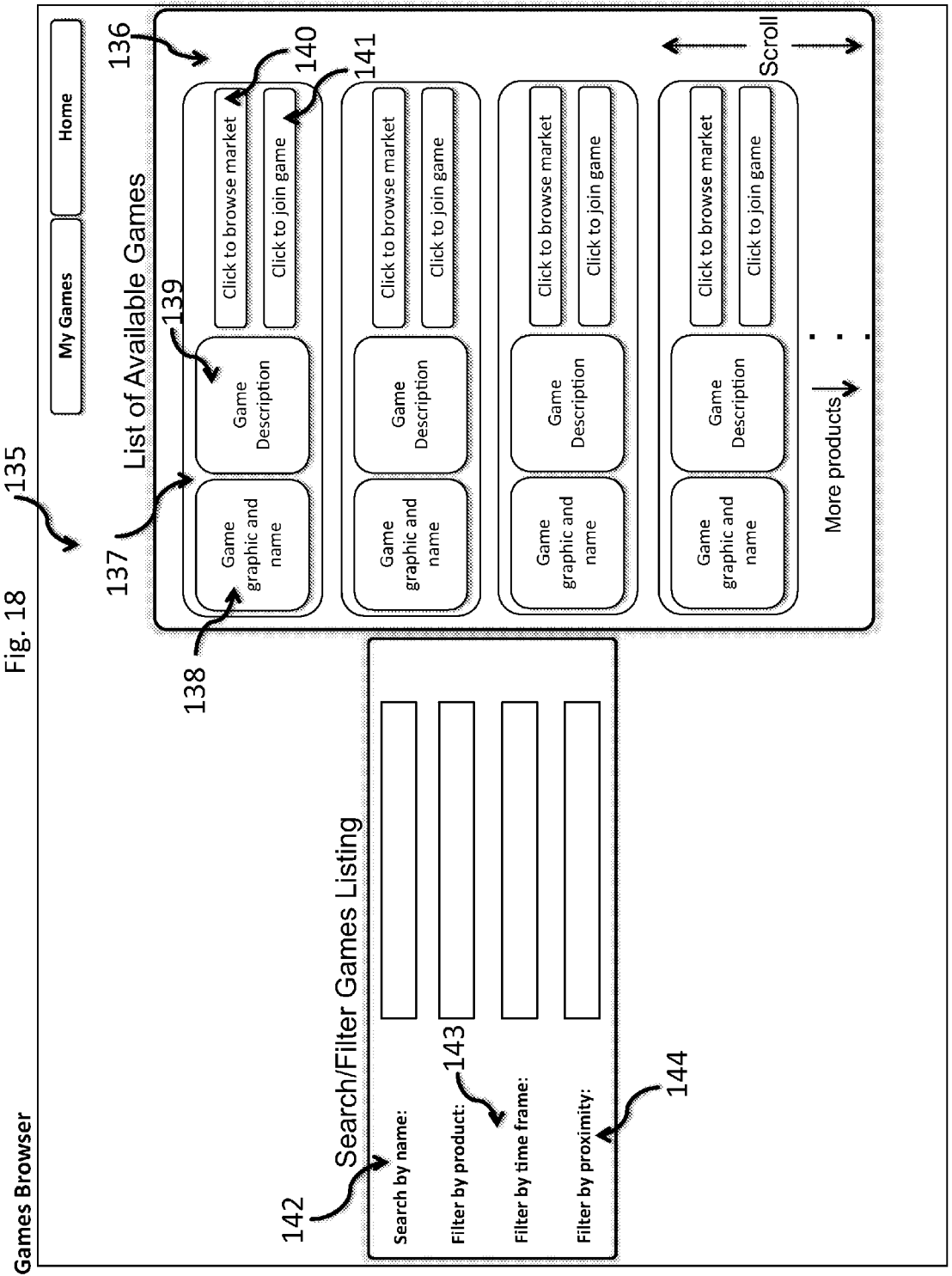
FIG. 18 shows the Games Browser where Users of the Platform may browse summaries of pertinent information regarding currently playable Games offered by Vendors. Users can link to the Market Images corresponding to the Games or join said Games.

Selecting 83 from home page 80 links Users directly to the Games Browser 135 shown in FIG. 18. Users may use the active, scrollable window to browse the plurality of Games (136) that are available from the plurality of Vendors within the web site 79. Each individual representation (137) within the Games Listing displays the name and representative graphic of the Game 138, a description of the Game 139, and options to browse the corresponding Market Image 140 or join the Game 141. The User can search for a specific Game (142) or filter, which Games are displayed (143) in window 136. Filtering by geographic proximity (144) is useful for Games where the corresponding Market is tied to a physical location (e.g., a restaurant with gamified menu items) and, as such, prizes may only be useful to those who are near said Market. Alternatively or in tandem, a possible modification to the current embodiment could allow a plurality of Players to trade or purchase Game prizes (e.g., vouchers for discounted restaurant meals) among themselves (or with the Platform operator) through a market making mechanism provided by the Platform.

Figure 19:
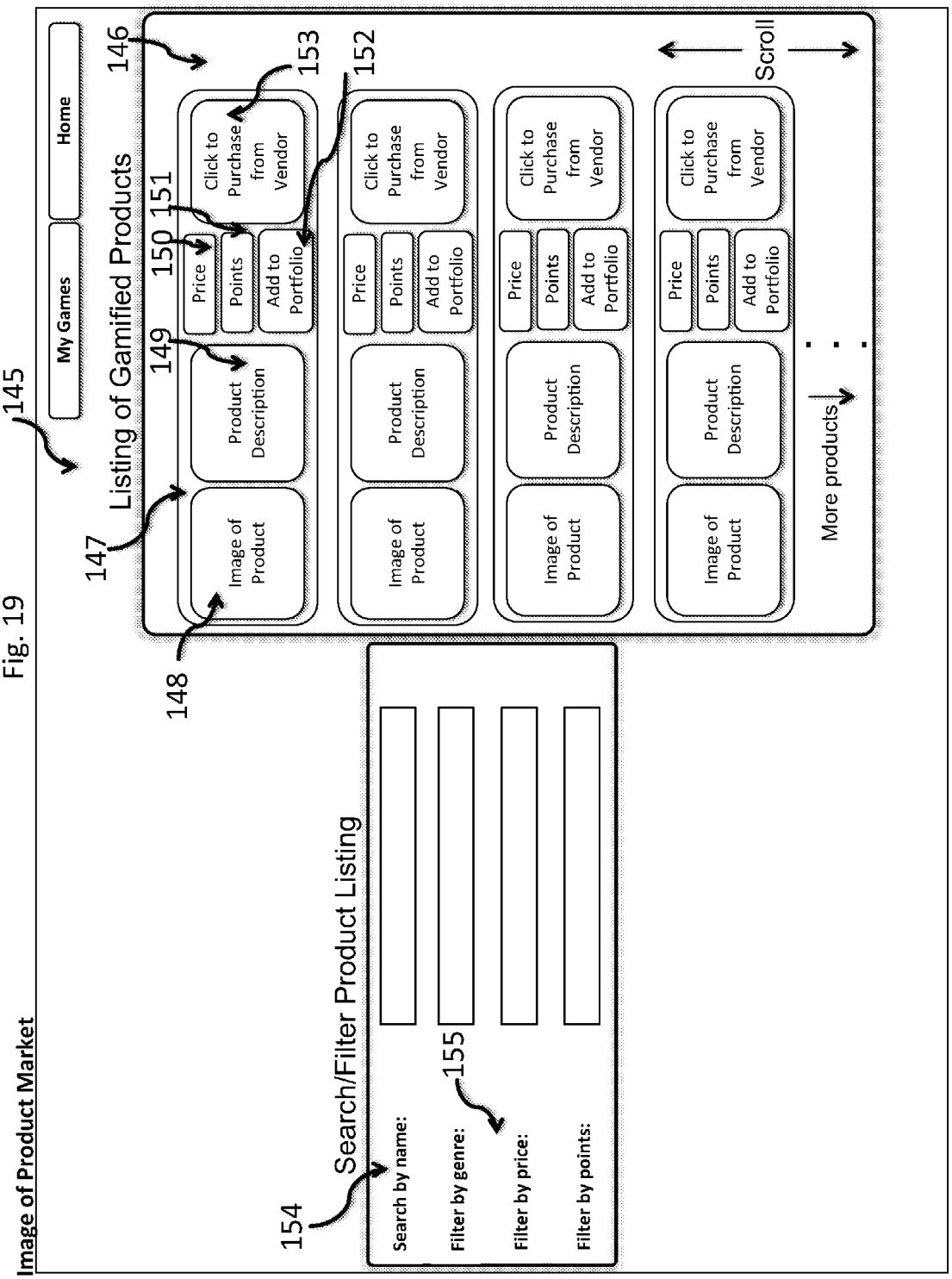
FIG. 19 shows a Product Market Image where Users of the Platform may browse summaries of pertinent information regarding products that have been gamified by the Vendor who designed the Game associated with the Market. Players may add products to their Game Portfolio (FIG. 16) or purchase the underlying products.

A User who elects to browse the Market associated with a Game in the Games browser 135 (e.g., by selecting 140) is taken to the corresponding Market Image (e.g., FIG. 19, 145). There the User can browse the gamified Market products 146 for said Game. Each individual representation (e.g., 147) within the Product Listing 146 displays an image of the product 148, a description of the product 149, the price of the product 150, the number of points paid per token for each purchase of the product 151, an option (152) to add the product to the User's portfolio (if they've registered to become a Player and have joined the Game), and an option (153) to purchase the product (by clicking through to original Market on Vendor site or through the Platform if enclosed). The User can search for a specific product (154) or filter which products are displayed (155) in window 146.

The disclosed method is beneficial to both Players and Vendors. The Player benefits because they are entertained and provided an opportunity to win prizes at no cost other than time spent managing their portfolio of products. Vendors benefit because the Game draws public attention to their Product Market and because Players who have placed tokes on products are implicitly incentivized to advertise those products to their social networks via social media, email lists, and personal relationships. Furthermore, significant data regarding market behavior and potential consumer preferences are generated by the assignment of tokens within the marketplace.

In yet another embodiment, the present invention provides a method for allowing a plurality of users to compete in a game to make predictions about the purchasing behavior of a plurality of other users. The method first provides one or more products for purchase by a user as well as others such as consumers not playing the game. It also provides one or more markers to a user and allows each user or game player to assign one or more markers to one or more of the products offered for sale. This, in turn, results in the creation of a unique marker portfolio reflecting the number of markers assigned each product by each user. Next, the invention generates for each marker a first data stream proportional to the total purchases of an individual product after the markers where assigned by a user. The data streams may then be aggregated to derive results for the game and other useful data.

The method may further comprise the steps of: allowing users to compare their unique marker portfolios; using the aggregation to provide an indication of game ranking to a user; allowing a user to compare aggregated data streams or transformations thereof associated with their unique marker portfolios to the aggregated data streams or transformations thereof generated by a plurality of unique marker portfolios associated with other users; allowing a user to modify their marker portfolio by dynamically changing the assignment of markers to a plurality of products; limiting the number of markers assignable to a product and/or the number of markers available to a user is limited; and, for a subset of users, indicating for the users an attribution to them of having higher point values as compared to other users at a predetermined point in time.

Other embodiments of the present invention provide methods of electronically forming a system to allow a user to play a game whereby they may electronically indicate their predictions about the purchasing behavior of a plurality of users interacting within a specific marketplace including the steps of: presenting a website to a user, the website providing at least one digital representation of a product for sale within the marketplace to a user; electronically allowing a user to view one or more products; electronically allowing a user to indicate their degree of belief that one or more products is likely to be purchased by other users by assigning one or more markers to a product; electronically allowing a user to change their indicated degree of belief that a product is likely to be purchased by other users by dynamically changing the markers assigned to a product; electronically tracking purchases of a product; and electronically apportioning recognition to a user proportional to their indicated degree of belief based on the markers assigned to a product when purchases of said product occur.

Additional steps may include but are not limited to allowing a user to track the recognition they have received based on the products that have been purchased by consumers and/or other users; allowing a user to compare their received recognition against the received recognition of other users; indicating the degrees of belief of the users or game player by electronic display, tracking or recording the successful predictions of players for each of the products.

Other embodiments provide one or methods of electronically forming a system to allow a user to play a plurality of games whereby they may electronically indicate their predictions about the purchasing behavior of a plurality of users interacting within a plurality of gamified marketplaces including the steps of: presenting a website to a user, the website providing at least one digital representation of a product for sale within a marketplace to a user; electronically allowing a user to view a plurality of gamified marketplaces; electronically allowing a user to view a single marketplace; electronically allowing a user to view a plurality of products within a selected marketplace; electronically allowing a user to indicate their degree of belief that a product within a selected marketplace is likely to be purchased by other users by assigning one or more markers to a product; electronically allowing a user to change their indicated degree of belief that said product is likely to be purchased by other users by allowing a user to dynamically reassign markers to a product; electronically tracking purchases of a plurality of products associated with a plurality of marketplaces; electronically apportioning recognition to a user proportional to the markers assigned to a product by a user when purchases of one or more products occur; and providing a means by which a marketplace owner/operator may specify the characteristics of a game associated with a marketplace they wish to gamify.

Additional steps for the above described methods include, but are not limited to, allowing one or more users or players to track the recognition they have received from products that have been purchased by one or more users within a plurality of gamified marketplaces; allowing one or more users or players to compare their received recognition associated with a gamified marketplace against the received recognition of a plurality of other users interacting with the same gamified marketplace; indicating the degrees of belief of a plurality of users for each of the plurality of products associated with marketplaces. Yet other steps include electronically observing, tracking, and recording information that may be electronically reported to marketplace owners/operators; permitting the characteristics of a game to be dynamically changed; dynamically changing the digital representations of a product; and limiting the number of markers available to a user and/or the number of markers assignable to a product by a user.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A computer-implemented method comprising:
presenting a website to a user, the website providing at least one digital representation of a product for sale within a marketplace;
receiving, from a plurality of users through the website, respective input specifying a number of markers for the product, the number of markers indicating a belief of a magnitude of the product that will be purchased through the marketplace over a period of time;
storing, for each of the plurality of users, the respective input specifying the number of markers for the product in a marker database;
receiving, from a database of the marketplace, purchase data over the period of time specifying the magnitude of the product that is purchased;
determining a respective amount of digital currency to be assigned to each of the plurality of users based on a proportionality between the respective stored inputs in the marker database and the purchase data; and
assigning the respective amount of digital currency to each of the plurality of users.

2. The method of claim 1, generating a user interface specifying a ranking of the plurality of users according to accumulated digital currency.

3. The method of claim 1, generating a user interface comparing accumulated digital currency of a first user with accumulated digital currency of a second user in the plurality of users.

4. The method of claim 1, further comprising tracking the number of markers provided by each of the plurality of users.

5. The method of claim 4, further comprising reporting the number of markers provided by each of the plurality of users to a manager of the marketplace.

6. The method of claim 1, wherein the number of markers available to the user is limited and the number of markers assignable to the product is limited.

7. The method of claim 1, wherein the product is a musical compositions in a digital format.

8. The method of claim 1, further comprising:
receiving additional input from a first user of the plurality of users for the product, the additional input specifying an adjusted number of markers for the product, the adjusted number of markers indicating an adjusted belief of a magnitude of the product that will be purchased through the marketplace over the period of time;
storing the adjusted number of markers for the product in the marker database;
determining a respective adjusted amount of digital currency to be assigned to each of the plurality of users based on a proportionality between the respective stored inputs in the marker database and the purchase data; and
reassigning the respective adjusted amount of digital currency to each of the plurality of users.

9. The method of claim 1, wherein the determining is based on a configuration provided by the marketplace, wherein the configuration specifies at least one of the following: a total number of markers to be assigned for the product, a maximum number of markers to be assigned per product per user, a duration during which the number of markers is assigned, the proportionality being based on a number of purchases, or the proportionality being based on a price of the product.

10. A method, comprising:
providing a user interface displaying a plurality of products from a plurality of marketplaces, each marketplace providing an interface to purchase a portion of the plurality of products, each marketplace maintained by a respective third-party server;
receiving, from the third-party servers, purchase data for each of the plurality of products;
receiving, for each of the plurality of products, user input from a plurality of users specifying a respective number of markers, the number of markers indicating a belief of a magnitude of the product that will be purchased through the respective marketplace over a period of time;
storing, for each of the plurality of users and each of the plurality of products, the user input specifying the respective number of markers for the product in a marker database;
determining a respective amount of digital currency to be assigned to each of the plurality of users based on a proportionality between the respective stored inputs in the marker database and the purchase data; and
assigning the respective amount of digital currency to each of the plurality of users.

* * * * *